US012620000B2

(12) United States Patent
Uehara et al.

(10) Patent No.: US 12,620,000 B2
(45) Date of Patent: May 5, 2026

(54) INVENTORY MANAGEMENT METHOD, RECORDING MEDIUM, AND INVENTORY MANAGEMENT DEVICE

(71) Applicant: CASIO COMPUTER CO., LTD., Tokyo (JP)

(72) Inventors: Kei Uehara, Tokyo (JP); Kentaro Maru, Tokyo (JP); Hironori Ishizuki, Tokyo (JP); Shinjiro Okuma, Tokyo (JP); Takayuki Aida, Tokyo (JP); Mitsuru Ito, Tokyo (JP); Chisato Mima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 82 days.

(21) Appl. No.: 18/702,118

(22) PCT Filed: Oct. 5, 2022

(86) PCT No.: PCT/JP2022/037294
§ 371 (c)(1),
(2) Date: Apr. 17, 2024

(87) PCT Pub. No.: WO2023/068052
PCT Pub. Date: Apr. 27, 2023

(65) Prior Publication Data
US 2025/0238824 A1     Jul. 24, 2025

(30) Foreign Application Priority Data
Oct. 19, 2021     (JP) .................................. 2021-171234

(51) Int. Cl.
*G06Q 30/0202*     (2023.01)
*G06Q 10/0875*     (2023.01)

(52) U.S. Cl.
CPC ..... *G06Q 30/0202* (2013.01); *G06Q 10/0875* (2013.01)

(58) Field of Classification Search
CPC ........... G06Q 30/0202; G06Q 10/0875; G06Q 10/06315; G06Q 10/08; G06Q 10/087;
(Continued)

(56) References Cited

U.S. PATENT DOCUMENTS 7,058,587 B1     6/2006   Horne
10,984,597 B1     4/2021   Goetzinger, Jr. et al.
(Continued)

FOREIGN PATENT DOCUMENTS

JP          H1011502 A     1/1998
JP          2002183408 A     6/2002
(Continued)

OTHER PUBLICATIONS

Extended European search report dated Jul. 3, 2025 received in European Patent Application No. 22883357.0.
(Continued)

*Primary Examiner* — Garcia Ade
(74) *Attorney, Agent, or Firm* — Scully, Scott, Murphy & Presser, P.C.

(57)     ABSTRACT

An inventory management method includes obtaining, by a computer, the number of parts in inventory for each part, that is the number of parts in inventory for each of a plurality of parts of a component constituting an object; obtaining, by the computer, the number of available supplies of each of a plurality of the component based on a component configuration master indicating a correspondence relationship between the component and the plurality of parts and the number of parts in inventory; obtaining, by the computer, demand data for each of a plurality of the component based on a behavior history, obtainable by an operation on a user (Continued)

terminal, of a user with regard to the object; and identifying, by the computer, a component that may become out of supply among a plurality of the component based on the number of available supplies and the demand data.

13 Claims, 17 Drawing Sheets

(58) Field of Classification Search
CPC .. G06Q 30/0201; G06Q 30/0621; Y02P 90/30
See application file for complete search history.

(56) References Cited

U.S. PATENT DOCUMENTS

| | | | |
|---|---|---|---|
| 2004/0113945 A1 | 6/2004 | Park et al. | |
| 2005/0119944 A1 | 6/2005 | Harasaki et al. | |
| 2006/0052894 A1* | 3/2006 | Ueno ................ | G06Q 10/0875 |
| | | | 700/106 |
| 2008/0245695 A1 | 10/2008 | Baker | |
| 2011/0282476 A1* | 11/2011 | Hegemier .......... | G06Q 30/0621 |
| | | | 705/26.5 |
| 2019/0279269 A1 | 9/2019 | Beaver et al. | |
| 2020/0233898 A1 | 7/2020 | Barzelay et al. | |
| 2021/0201235 A1* | 7/2021 | Lim .................... | G06Q 10/087 |
| 2021/0240202 A1 | 8/2021 | Yesh | |
| 2022/0346591 A1 | 11/2022 | Knowles et al. | |
| 2023/0368134 A1* | 11/2023 | Kagami ............. | G06K 7/10297 |
| 2024/0013243 A1* | 1/2024 | Oguchi .................... | G07G 1/12 |

FOREIGN PATENT DOCUMENTS

| | | | |
|---|---|---|---|
| JP | 2002189844 A | 7/2002 | |
| JP | 2002312022 A | 10/2002 | |
| JP | 2002328984 A | 11/2002 | |
| JP | 2005190041 A | 7/2005 | |
| JP | 2006072746 A | 3/2006 | |
| JP | 2006244470 A | 9/2006 | |
| JP | 2007249440 A | 9/2007 | |
| JP | 2008015873 A | 1/2008 | |
| JP | 4363279 B2 | 11/2009 | |
| JP | 2015513709 A | 5/2015 | |
| JP | 2015528946 A | 10/2015 | |
| JP | 2016091272 A | 5/2016 | |
| JP | 2017033362 A | 2/2017 | |
| JP | 2017041281 A | 2/2017 | |
| JP | 2017182560 A | 10/2017 | |
| WO | 2021136988 A1 | 7/2021 | |

OTHER PUBLICATIONS

Extended European search report dated Jul. 8, 2025 received in European Patent Application No. 22883359.6.

Notice of Reasons for Refusal dated Jul. 8, 2025 received in Japanese Patent Application No. 2022-197115.

Makino, H., "I tried putting a sapphire in my watch! Review of Citizen's custom order experience", Kakaku.com Magazine, Feb. 2021, Retrieved from the Internet <https://kakakumag.com/fashion/?id=16561>.

Notice of Reasons for Refusal dated Aug. 27, 2024 received in Japanese Patent Application No. 2023-187427.

International Search Report dated Dec. 27, 2022 issued in PCT/JP2022/037289.

Japanese First Office Action dated Jan. 4, 2023 issued in JP 2021-171228.

Japanese Second Office Action dated Jun. 27, 2023 issued in JP 2021-171228.

International Search Report dated Dec. 27, 2022 issued in PCT/JP2022/037294.

International Search Report dated Nov. 22, 2022 issued in PCT/JP2022/037300.

Extended European search report dated Apr. 28, 2025 received in European Patent Application No. 22883356.2.

https://web.archive.org/web/20200319101702/https://www.undone.com/en/ (Year: 2020).

Office Action dated Sep. 15, 2025 received in U.S. Appl. No. 18/702,058.

Office Action dated Jan. 27, 2026 received in U.S. Appl. No. 18/702,168.

* cited by examiner

310

Watch #1
Default
model

Watch #1
Designer A
customized model

Watch #1
Athlete O
customized model

310

Watch #1 Designer A customized model details

311

312

CUSTOMIZE

ADD IN A CART

SHARE

BOOKMARK

310

Customizing

DONE   SHARE

312

SU 6-30
10:58 30

SELECT COMPONENT
Bezel
Face
Short Band
Long Band
Buckle
Band Loop

313

314 ...

310

Customizing

318 DONE   SHARE 319

510

312

SU 6-30
10:58 30

SELECT COMPONENT
Bezel
Face
Short Band
Long Band
Buckle
Band Loop

313

SELECT VARIATION

316

314 ...

Sold Out

| COMPONENT | VARIATION | PRICE | NUMBER IN INVENTORY | AVAILABLE FOR PURCHASE |
|---|---|---|---|---|
| COMPONENT A | A-1 | +0 | 30 | ◯ |
|  | A-2 | +0 | 40 | ◯ |
|  | A-3 | +1,000 | 50 | ◯ |
| COMPONENT B | B-1 | +0 | 20 | ◯ |
|  | B-2 | +2,000 | 10 | ◯ |
|  | B-3 | +3,000 | 0 | × |
| COMPONENT C | C-1 | +0 | 20 | ◯ |
|  | C-2 | +1,000 | 30 | ◯ |
|  | C-3 | +2,000 | 40 | ◯ |
| WATCH #2 DEFAULT MODEL | – | 20,000 | – | – |

124 ... PRICE
123 ... NUMBER IN INVENTORY

| WATCH #2 DEFAULT MODEL | | 20,000 |
|---|---|---|
| COMPONENT A | A-1 | +0 |
| COMPONENT B | B-2 | +2,000 |
| COMPONENT C | C-2 | +1,000 |
| WATCH #2 CUSTOMIZED MODEL | TOTAL PRICE | 23,000 |

Figure 11:
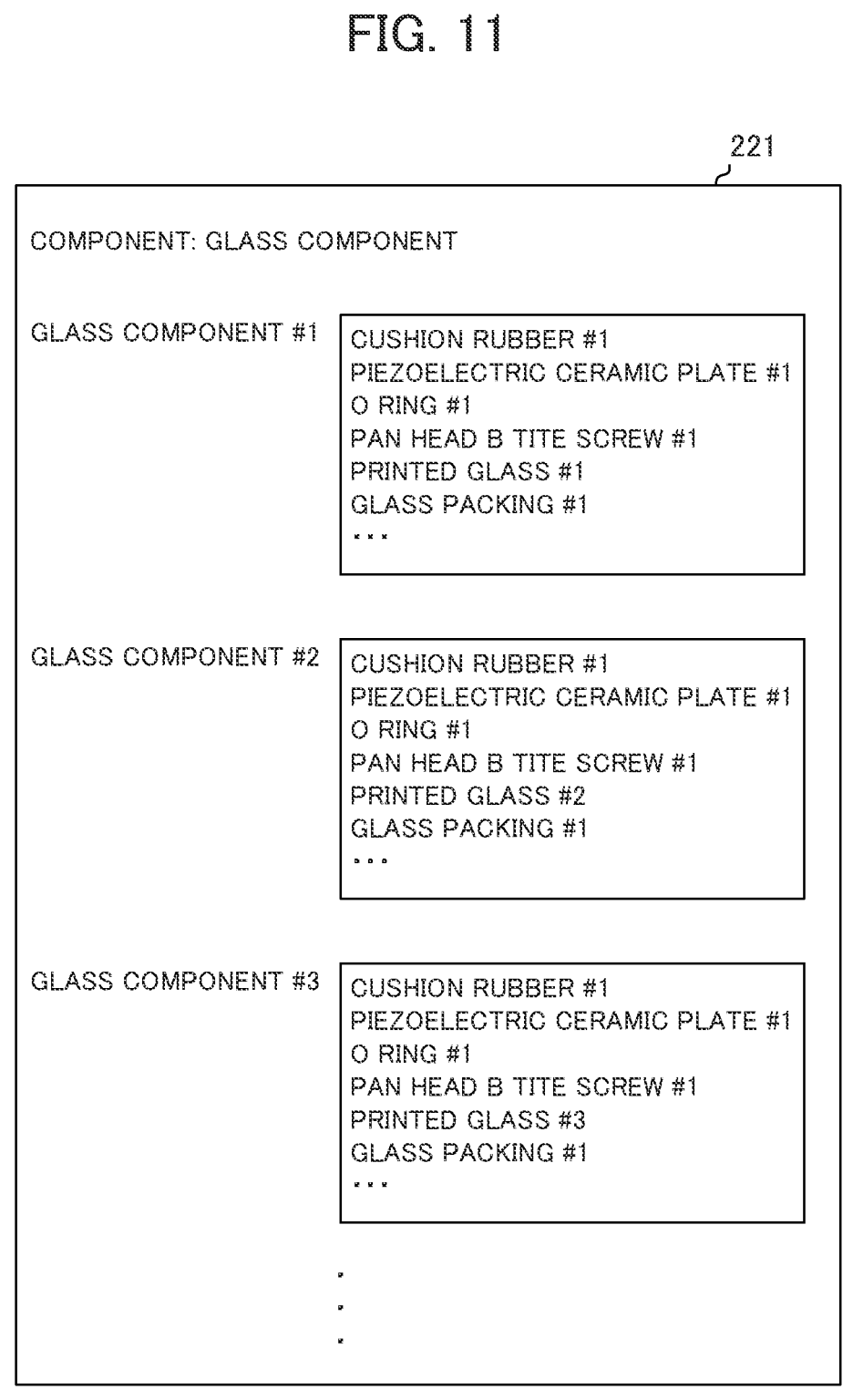

COMPONENT: GLASS COMPONENT

GLASS COMPONENT #1

CUSHION RUBBER #1
PIEZOELECTRIC CERAMIC PLATE #1
O RING #1
PAN HEAD B TITE SCREW #1
PRINTED GLASS #1
GLASS PACKING #1
. . .

GLASS COMPONENT #2

CUSHION RUBBER #1
PIEZOELECTRIC CERAMIC PLATE #1
O RING #1
PAN HEAD B TITE SCREW #1
PRINTED GLASS #2
GLASS PACKING #1
. . .

GLASS COMPONENT #3

CUSHION RUBBER #1
PIEZOELECTRIC CERAMIC PLATE #1
O RING #1
PAN HEAD B TITE SCREW #1
PRINTED GLASS #3
GLASS PACKING #1
. . .

| COMPONENT | PARENT | EXCLUDED-CHILD | QTY RATIO | SUBJECT TO VARIATION | NOT SUBJECT TO VARIATION |
|---|---|---|---|---|---|
| GLASS COMPONENT | WATCH HEAD | BACK COVER, BEZEL | – | PRINTED GLASS #* | – |
| BEZEL COMPONENT | BEZEL | – | – | BEZEL #* | – |
| BAND PART (L) COMPONENT | BAND PART (L) | – | – | BAND PART (L) #* | SPRING BAR #1 |
| BAND PART (S) COMPONENT | BAND PART (S) | – | – | BAND PART (S) #* | SPRING BAR #1 |
| BUCKLE COMPONENT | BUCKLE | – | – | BUCKLE #* | BUCKLE SPRING BAR #1 |
| BAND LOOP 1 COMPONENT | BAND LOOP 1 | – | – | BAND LOOP 1 #* | – |
| BAND LOOP 3-1 COMPONENT | BAND LOOP 3 | – | 1 | BAND LOOP 3 #* | – |
| BAND LOOP 3-2 COMPONENT | BAND LOOP 3 | – | 1 | BAND LOOP 3 #* | – |
| BAND LOOP 3-3 COMPONENT | BAND LOOP 3 | – | 1 | BAND LOOP 3 #* | – |
| ... | ... | ... | ... | ... | ... |

FIG. 14

| | PART α | | | | | PART β | | | PART γ | COMPONENT DEMAND | NUMBER OF AVAILABLE COMPONENTS = COMPONENT INVENTORY | |
| | α-1 | α-2 | α-3 | α-4 | α-5 | β-1 | β-2 | β-3 | γ-1 | | PRIORITIES ARE THE SAME | A2 PRIORITY IS HIGH |
|---|---|---|---|---|---|---|---|---|---|---|---|---|
| PARTS INVENTORY → | 400 | 400 | 400 | 400 | 400 | 400 | 400 | 400 | 400 | | | |
| A-1 | O | | | | | O | | | O | 400 | 200 | 150 |
| A-2 | | O | | | | O | | | O | 160 | 80 | 160 |
| COMPONENT A  A-3 | | | O | | | | O | | O | 120 | 60 | 45 |
| A-4 | | | | O | | | O | | O | 80 | 40 | 30 |
| A-5 | | | | | O | | | O | O | 40 | 20 | 15 |
| DEPENDENT DEMAND OF PARTS → | 400 | 160 | 120 | 80 | 40 | 560 | 200 | 40 | 800 | | | |

FIG. 18

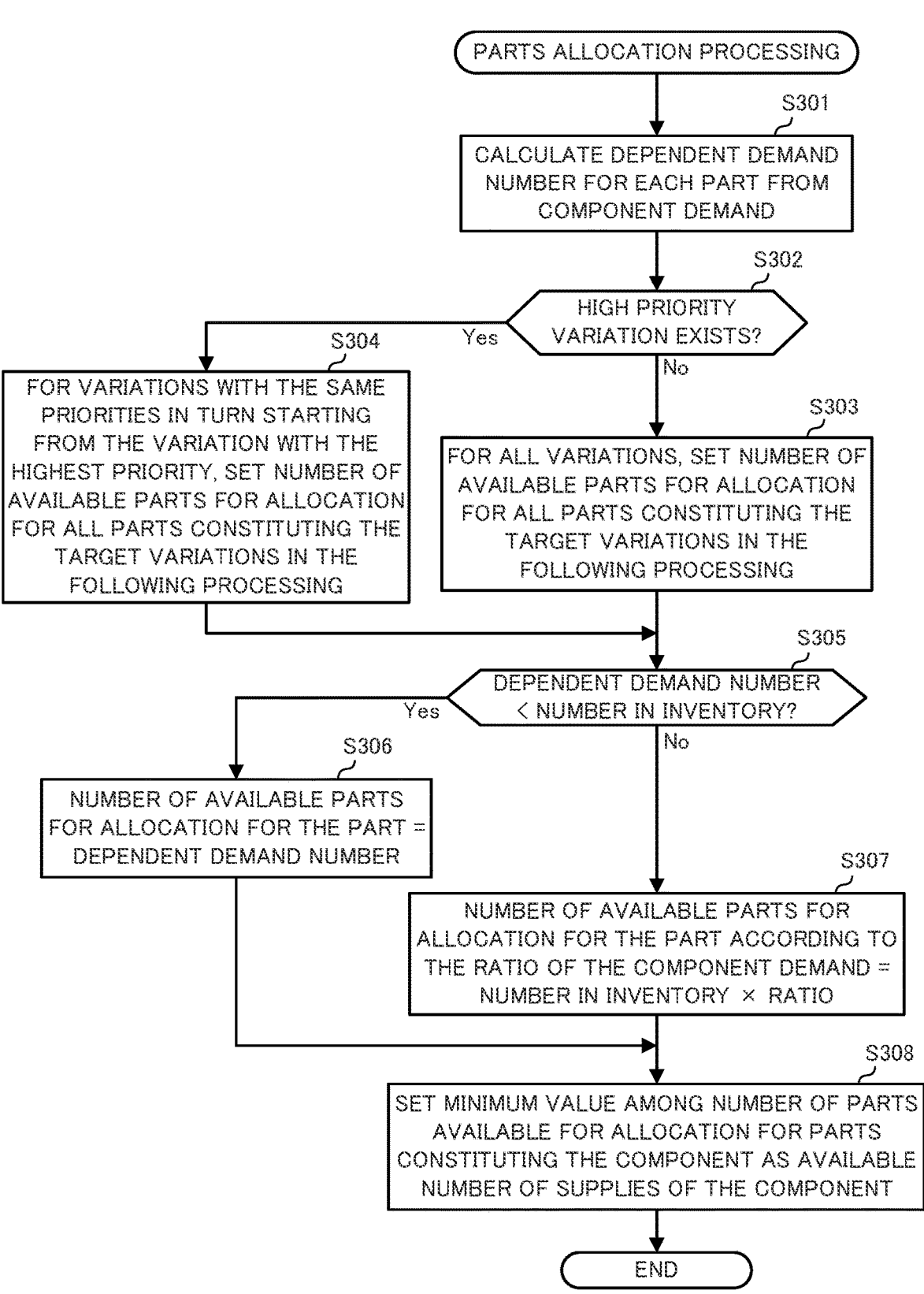

PARTS ALLOCATION PROCESSING

S301
CALCULATE DEPENDENT DEMAND NUMBER FOR EACH PART FROM COMPONENT DEMAND

S302
HIGH PRIORITY VARIATION EXISTS?

Yes

No

S304
FOR VARIATIONS WITH THE SAME PRIORITIES IN TURN STARTING FROM THE VARIATION WITH THE HIGHEST PRIORITY, SET NUMBER OF AVAILABLE PARTS FOR ALLOCATION FOR ALL PARTS CONSTITUTING THE TARGET VARIATIONS IN THE FOLLOWING PROCESSING

S303
FOR ALL VARIATIONS, SET NUMBER OF AVAILABLE PARTS FOR ALLOCATION FOR ALL PARTS CONSTITUTING THE TARGET VARIATIONS IN THE FOLLOWING PROCESSING

S305
DEPENDENT DEMAND NUMBER < NUMBER IN INVENTORY?

Yes

No

S306
NUMBER OF AVAILABLE PARTS FOR ALLOCATION FOR THE PART = DEPENDENT DEMAND NUMBER

S307
NUMBER OF AVAILABLE PARTS FOR ALLOCATION FOR THE PART ACCORDING TO THE RATIO OF THE COMPONENT DEMAND = NUMBER IN INVENTORY × RATIO

S308
SET MINIMUM VALUE AMONG NUMBER OF PARTS AVAILABLE FOR ALLOCATION FOR PARTS CONSTITUTING THE COMPONENT AS AVAILABLE NUMBER OF SUPPLIES OF THE COMPONENT

END

INVENTORY MANAGEMENT METHOD, RECORDING MEDIUM, AND INVENTORY MANAGEMENT DEVICE

TECHNICAL FIELD

The present disclosure relates to an inventory management method, a recording medium, and an inventory management device.

BACKGROUND ART

Conventionally, products have been produced based on production plans. In addition, measures to cope with changes in the production plans or delays in parts delivery have also been studied. For example, Patent Literature 1 discloses a parts delivery progress management system and the like that can grasp the tendency of production bottlenecks and suppress a decline in production efficiency.

CITATION LIST

Patent Literature

Patent Literature 1: Unexamined Japanese Patent Application Publication No. 2002-312022

SUMMARY OF INVENTION

Technical Problem

The parts delivery progress management system disclosed in Patent Literature 1 enables appropriate responses to production bottlenecks by allowing a manager to grasp the tendency of production bottlenecks of a machine model in advance by judging the assortment status and checking the order status prior to the scheduled delivery date of the component parts. However, since the response is based solely on the production plan, if the production plan does not match the demand, there is a surplus or out-of-stock of parts.

The present disclosure is made in consideration of the above-described situation. The objective of the disclosure is to provide an inventory management method, a recording medium, and an inventory management device that can identify a component that may be out of supply based on the demand for each component in an object having a plurality of components.

Solution to Problem

In order to achieve the above-mentioned objective, an aspect of the inventory management method according to the present disclosure includes:

obtaining, by a computer, a number of parts in inventory for each part, that is the number of parts in inventory for each of a plurality of parts of a component constituting an object;

obtaining, by the computer, a number of available supplies of each of a plurality of the component based on a component configuration master indicating a correspondence relationship between the component and the plurality of parts and the number of parts in inventory;

obtaining, by the computer, demand data for each of a plurality of the component based on a behavior history, obtainable by an operation on a user terminal, of a user with regard to the object; and identifying, by the computer, a component that is likely to become out of supply among a plurality of the component based on the number of available supplies and the demand data.

Advantageous Effects of Invention

According to the present disclosure, a component that may become out of supply can be identified based on the demand of each component in an object having a plurality of components.

BRIEF DESCRIPTION OF DRAWINGS

FIG. 8 is a diagram illustrating an example of component image information according to the present embodiment;

FIG. 9 is a diagram illustrating an example of price information and the like according the present embodiment;

FIG. 11 is a diagram illustrating an example of a component configuration master according to the present embodiment;

FIG. 13 is a diagram illustrating an example of a mapping rule according to the present embodiment;

FIG. 14 is a diagram illustrating a component inventory calculation method according to the present embodiment;

FIG. 18 is a flowchart of parts allocation processing according to the present embodiment.

DESCRIPTION OF EMBODIMENTS

Figure 1:
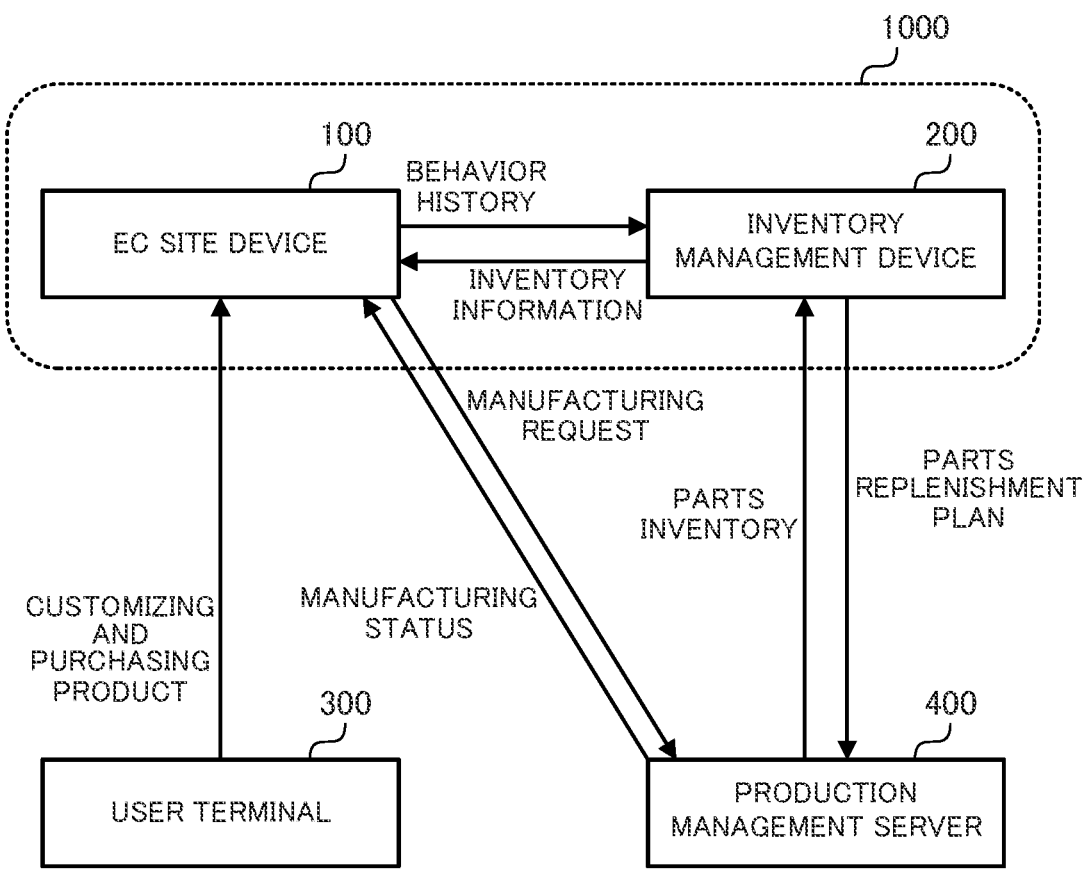
FIG. 1 is a diagram illustrating an example of the configuration of a product customization system according to the present embodiment.

The display control method and the like according to the present embodiment are explained with reference to the drawings. Note that the same signs are used for identical or equivalent parts in the drawings.

Present Embodiment

For ease of understanding, a display control method and the like according to the present embodiment is described below using a case as an example in which the display control method is applied to a product customization system 1000 illustrated in FIG. 1. The product customization system 1000 comprises an EC site device 100 and an inventory management device 200, as illustrated in FIG. 1.

The EC site device 100 is a server that provides an electronic commerce (EC) site that sells customizable products based on inventory information obtained from the inventory management device 200. A user can access the EC site device 100 from a user terminal 300, such as a personal computer (PC) or a smart phone, to purchase a product customized to the user's preference.

Figure 2:
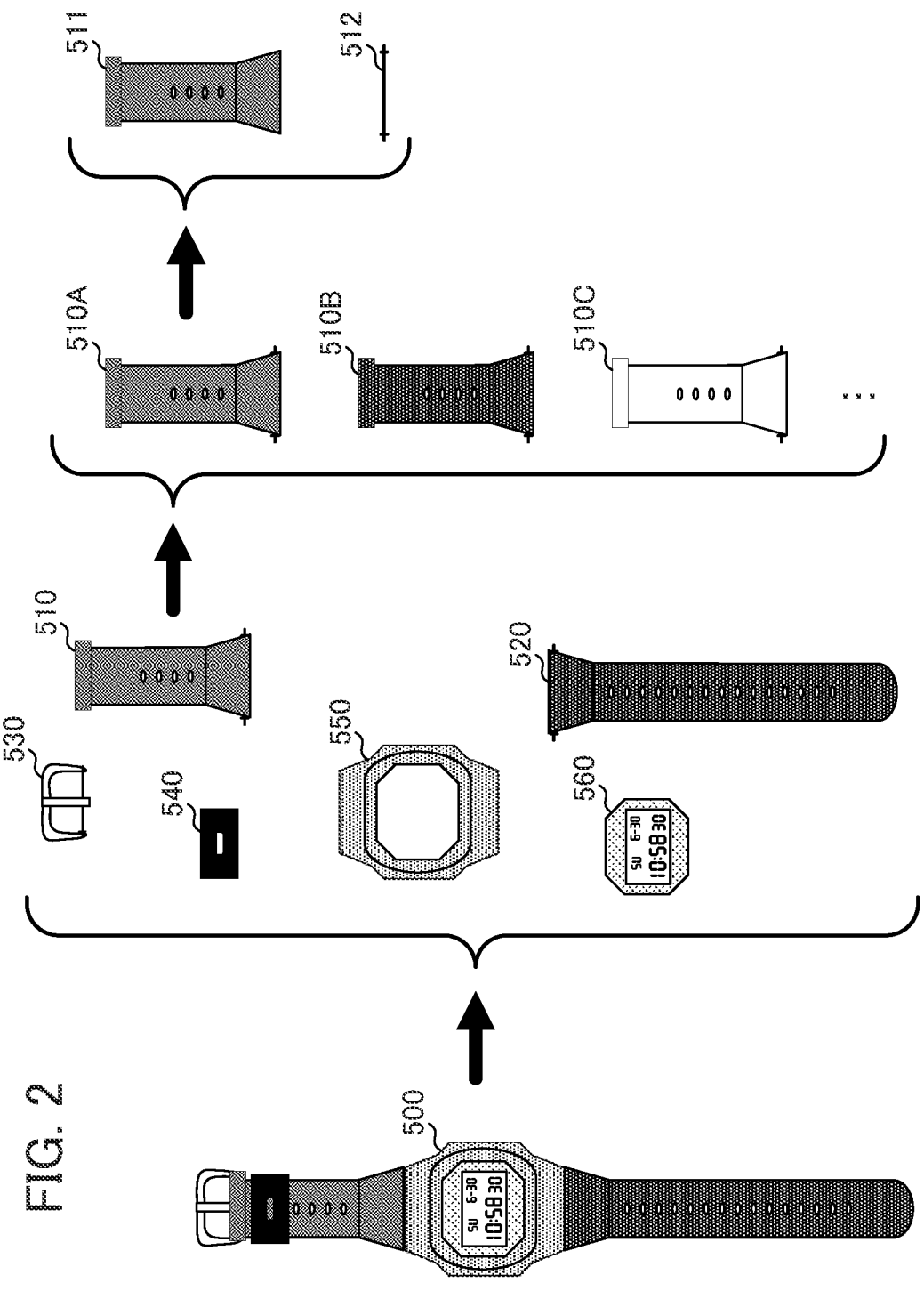
FIG. 2 is a diagram illustrating an example of a component of a wristwatch according to the present embodiment.

This customizable product comprises a plurality of components and is customized by changing the specifications of the components (variations that are described later). The component in turn comprises one or more parts. As an example of the customizable product and component, a wristwatch 500 illustrated in FIG. 2 is described as an example.

The wristwatch 500 is configured by combining a plurality of components, including a band(S) component 510, a band (L) component 520, a buckle component 530, a band loop component 540, a bezel component 550, and a glass component 560 and the like. Each component can then be selected from among a plurality of specifications (color, material, number of pieces, and the like), and the specifications that can be selected are called variations (selectable specifications).

For example, the band(S) component 510 includes a band(S) component 510A, a band(S) component 510B, a band(S) component 510C, and the like as different color variations. The band(S) component 510 comprises two parts, a band(S) 511 and a spring bar 512, and a plurality of variations is provided by combining the band(S) 511 and the spring bar 512 in different colors.

In other words, variations (selectable specifications) refer to, for example, those in which the color, material, number of parts that constitute the band(S) component 510 are changed. Specifically, the band(S) component 510A has a band that is orange in color and made of resin, while the band(S) component 510B has a band that is black in color and made of metal. As such, depending on the variation, properties (attributes) such as the color, material, and number of parts, are arbitrarily changed. The number of variations is also arbitrary and need not be the same for each component.

Other components, not illustrated in the drawings, similarly comprises one or more parts, and a plurality of variations is provided by changing the color, material, number of parts, and/or the like.

Returning to FIG. 1, the EC site device 100 transmits information on the user's behavior history (the history of browsing, selecting, ordering, and/or the like of products and components by the user on the EC site) received from the user terminal 300 to the inventory management device 200. When the EC site device 100 accepts a purchase settlement for a product from the user terminal 300, it transmits a manufacturing request for that product to the production management server 400.

The inventory management device 200 knows the correspondence between components and parts, calculates the inventory of components (the number of components that can be provided) from the inventory of parts, and, when the inventory of components is in short, transmits the number of parts in short to the production management server 400 as a parts replenishment plan.

In particular, the inventory management device 200 acquires information on the user's behavior history from the EC site device 100 and information on the number of parts in inventory from the production management server 400, respectively, and transmits the component inventory information calculated based on this information to the EC site device 100. When an out-of-stock of parts is expected based on this information, the inventory management device 200 calculates a parts replenishment plan to prevent from running out of stock and transmits the plan to the production management server 400.

The production management server 400 is a server that manages the inventory of parts and the production of products, and/or the like. For example, the production management server 400 transmits the parts inventory information to the inventory management device 200 and transmits the product manufacturing status to the EC site device 100. The production management server 400 obtains information on components (the information of the component configuration master described below) at arbitrary timing. The obtainment of the information of the component configuration master by the production management server 400 is described below.

The following describes the functional configuration and the like of the EC site device 100 and the inventory management device 200.

Figure 3:
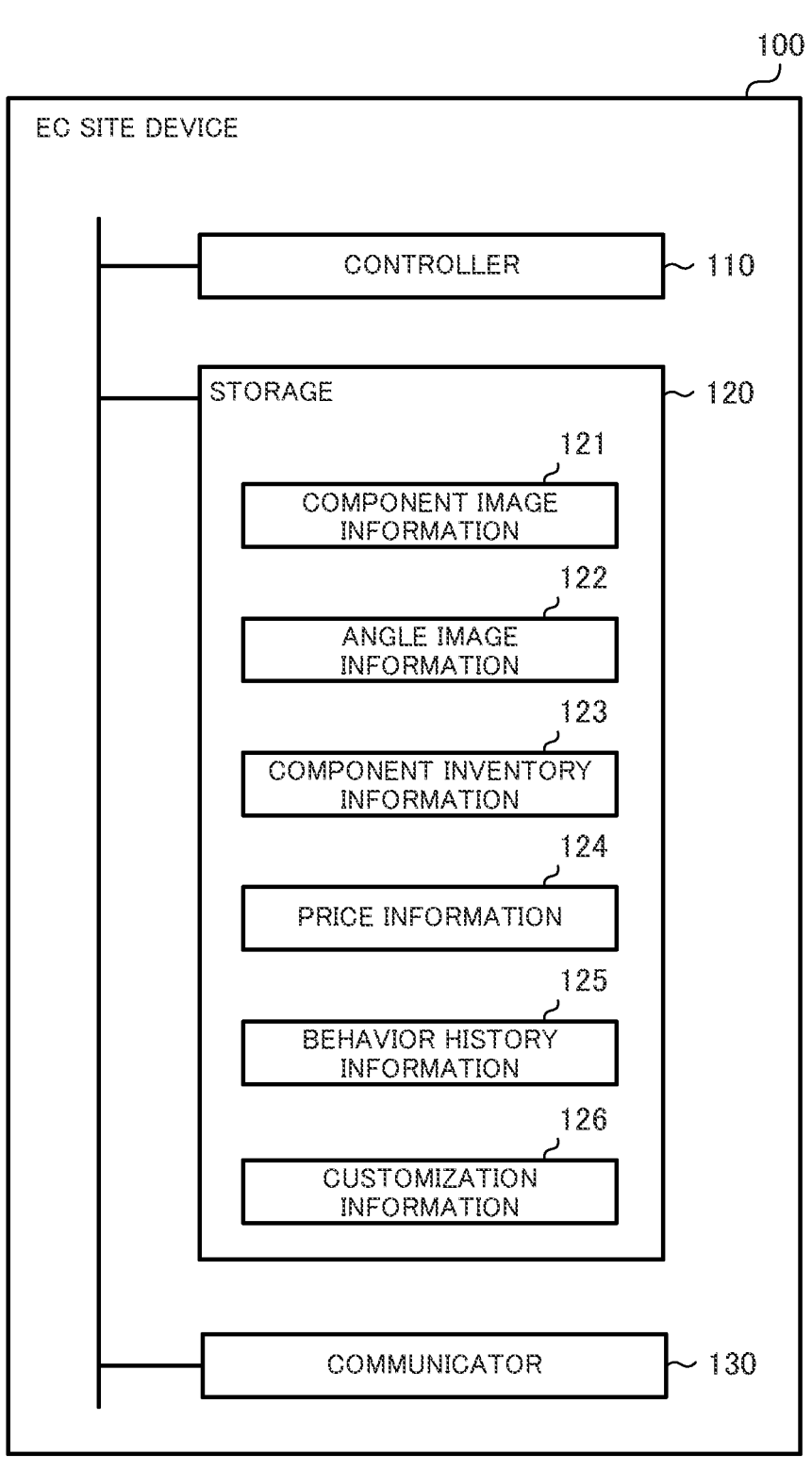
FIG. 3 is a diagram illustrating an example of the functional configuration of an e-commerce (EC) site device according to the present embodiment.

The EC site device 100 has a controller 110, a storage 120, and a communicator 130, as illustrated in FIG. 3, as its functional configuration.

The controller 110, for example, comprises a processor, such as a central processing unit (CPU). The controller 110 executes a program stored in the storage 120 to cause the EC site device 100 to function as a web server for the EC site.

The storage 120 stores a program to be executed by the controller 110 and necessary data. The storage 120 may include, but is not limited to, random access memory (RAM), read only memory (ROM), solid state drive (SSD), hard disk drive (HDD), and/or the like.

The communicator 130 is a communication interface for the EC site device 100 to transmit and receive data to and from the inventory management device 200, user terminal 300, production management server 400, and/or the like.

Figure 4:
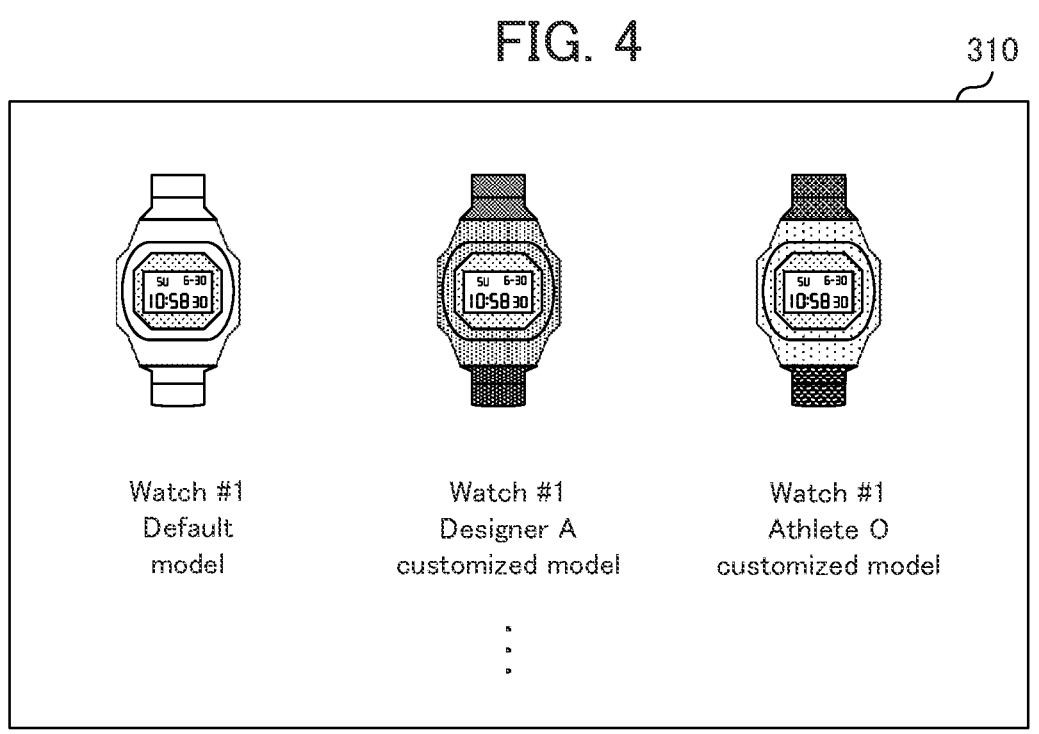
FIG. 4 is a diagram illustrating an example of a screen for Internet shopping for customizable products on the EC site according to the present embodiment.

With the functional configuration described above, the EC site device 100 provides EC site functions when connected by the user terminal 300, and displays, for example, a list of wristwatches available for Internet shopping on the screen 310 that is the display of the user terminal 300, as illustrated in FIG. 4.

In FIG. 4, a "default model" with no customization, a "designer A customized model" customized by designer A, and an "athlete O customized model" customized by popular athlete O are displayed on the screen 310 as wristwatches with the model number "watch #1." This is an example of the display, and the EC site device 100 may, for example, display wristwatches with different model numbers on the screen 310, or display customized models with different model numbers on the screen 310. Alternatively, the EC site device 100 may also display only the default model of each model number wristwatch on the first page of the EC site, and display the customized models on a separate dedicated page.

Figure 5:
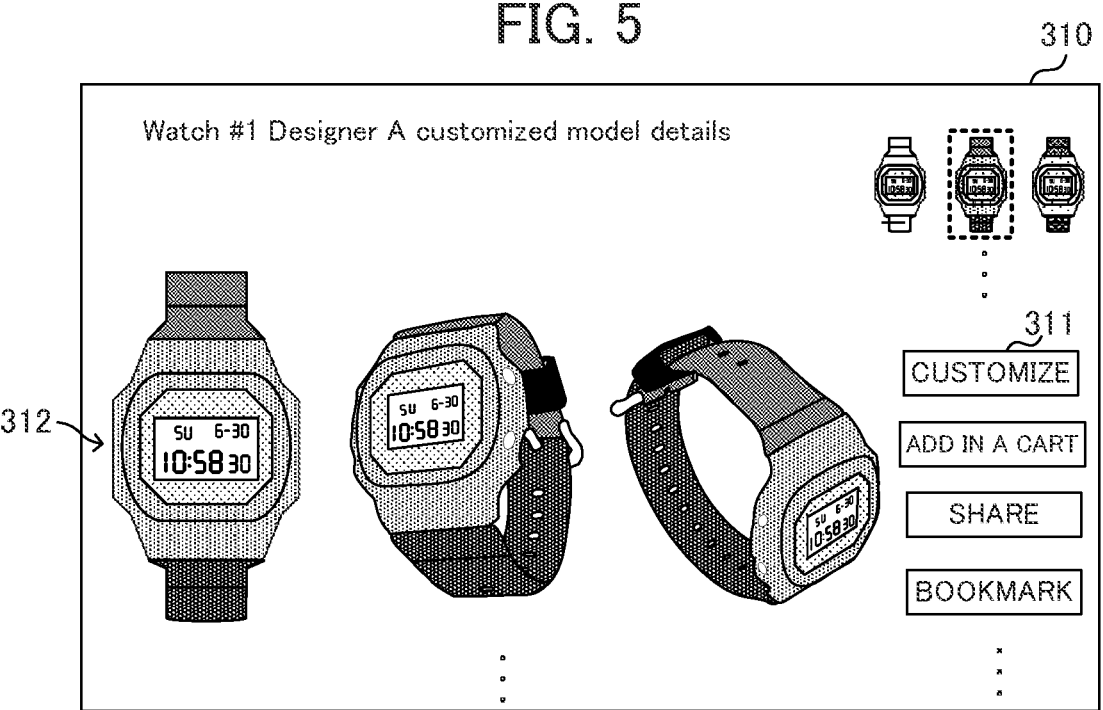
FIG. 5 is a diagram illustrating an example of a screen displaying detailed information on a product selected on the EC site according to the present embodiment.

On the screen 310 illustrated in FIG. 4, when a user selects, for example, "watch #1 designer A customized model" (for example, by clicking or tapping the wristwatch to be selected on the screen), the EC site device 100 displays on the screen 310 of the user terminal 300 detailed information on the selected product as illustrated in FIG. 5. What information to display as detailed product information is arbitrary, but in FIG. 5, a plurality of angle images 312 that is images of the selected wristwatch viewed from various angles (a plurality of viewing directions) is displayed.

Although only three angle images 312 are illustrated on the screen 310 in FIG. 5, angle images that make the component effectively visible are provided for each of the user-selectable components according to the present embodiment. Angle images (for example, an overall bird's-eye view from the front, an overall bird's-eye view from the back, an image from right beside, a roll cut image) are also provided to confirm the overall design of the product. However, how many types of angle images 312 and from what angles the angle images 312 are provided is arbitrary.

Figures 6, 7:
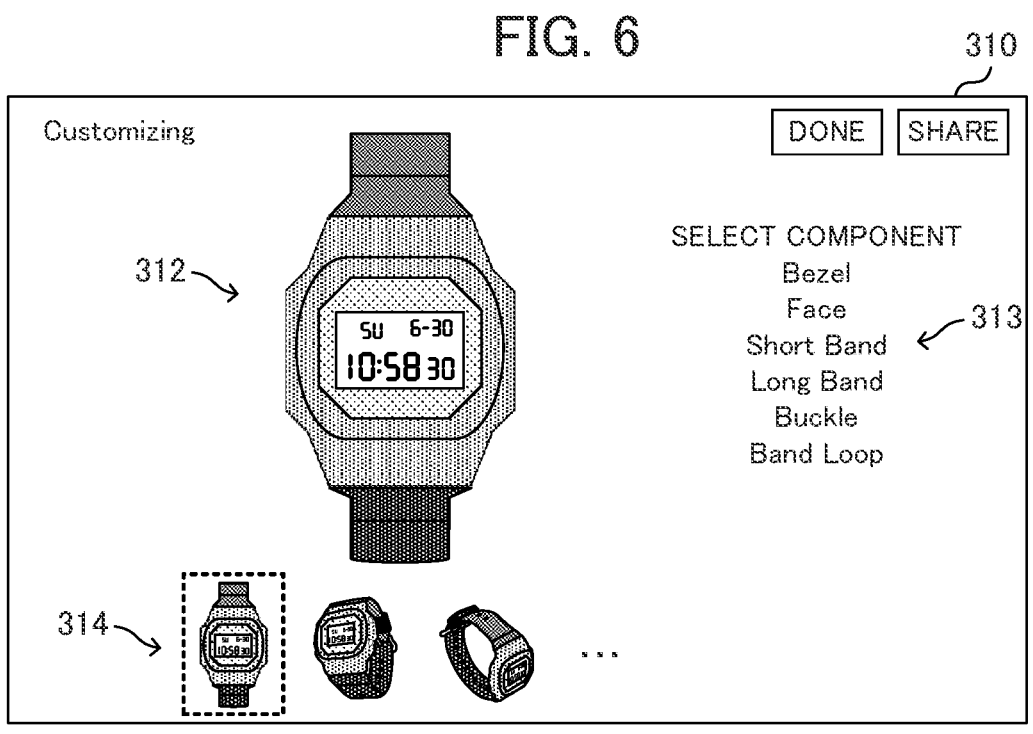
FIG. 6 is a diagram illustrating an example of a screen for customizing a product on the EC site according to the present embodiment.
FIG. 7 is a diagram illustrating an example of a screen where a component of the product is selected on the EC site according to the present embodiment.

When the user presses (for example, clicks, taps) the customize button 311 at the upper right on the screen 310 illustrated in FIG. 5, the EC site device 100 displays on the screen 310 of the user terminal 300 a customization screen for customizing each component of the product, as illustrated in FIG. 6. FIG. 6 is an example of the customization screen. In this example, a default angle image 312 of the product to be customized (for example, an angle image viewed from the front) is displayed in a large size near the center of the screen, a list of selectable angle images 312 is displayed as thumbnail images 314 at the bottom of the screen, and at the right of the screen a list of selectable components 313 is displayed.

In FIG. 6, in the select component section, Bezel, Face, Short Band, Long Band, Buckle, and Band Loop are displayed as components 313 that correspond to a bezel component 550, a glass component 560, a band(S) component 510, a band (L) component 520, a buckle component 530, and a band loop component 540, respectively.

When the user selects an angle image 312 to view from the list of thumbnail images 314, the EC site device 100 displays the selected angle image 312 in a large size near the center of the screen 310.

When the user selects a component 313 to be customized from the list of components 313, the EC site device 100 selects an angle image 312 that effectively makes the selected component 313 (the band(S) component 510 in FIG. 7) visible, as illustrated in FIG. 7, and displays the selected angle image 312 in a large size near the center of the screen 310. This angle image 312 that makes the selected component 313 easier to see (effectively visible) is called an effective angle image.

The EC site device 100 then displays a list of items for customization (selectable variations) 315 for the selected component 313 on the screen 310. Here, color variation items can be selected as selectable variations for the band(S) component 510. The color that has already been selected is marked with a check mark 316, and the color that cannot be provided due to a shortage of parts (that is, out of stock) is marked with a sold-out mark 317.

When the user selects a different color than the currently selected color as the item for customization 315, the color of the band(S) component 510 of the wristwatch in the angle image 312 (effective angle image) on the screen 310 is changed to the selected color.

The user can customize the wristwatch by selecting a variation on the customization screen for the component that the user wishes to customize. When the customization is complete, the user can end the customization by pressing the done button 318. The user can also post information on the image of the customized model to a social networking service (SNS) and/or the like by pressing the share button 319.

Figure 8:
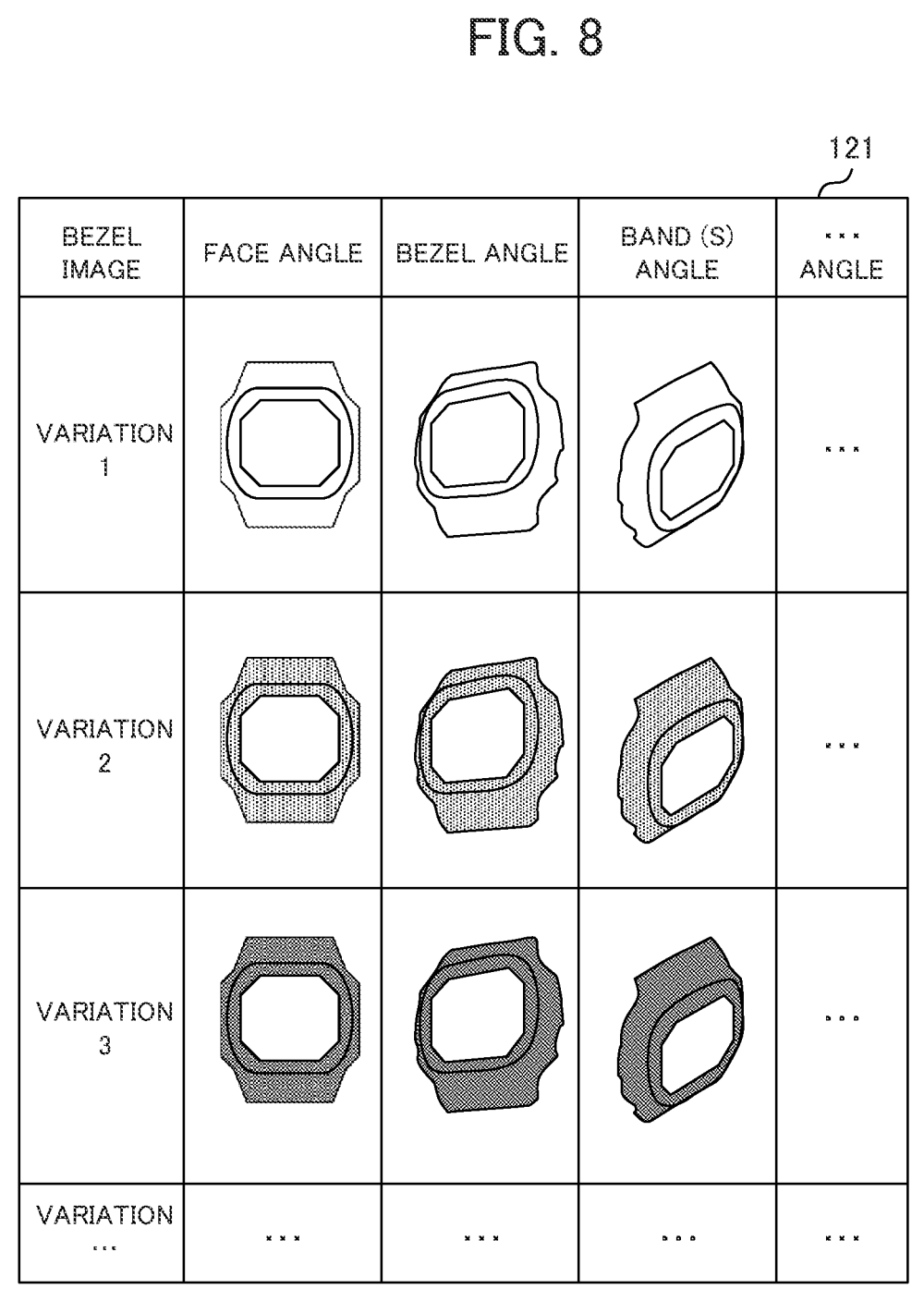

Returning to FIG. 3 the various information stored in the storage 120 is described. Component image information 121 is image material (variation image) information for each variation for each angle of each component. For example, as component image information 121 of the bezel component, an image material for each angle image is stored for each variation of the bezel component, as illustrated in FIG. 8. Similar component image information 121 is stored in the storage 120 for other components.

Angle image information 122 is information indicating which component's image material is synthesized to generate an angle image of each product. The controller 110 can generate an arbitrary angle image of a product by synthesizing an image material of the component image information 121 based on the angle image information 122.

Component inventory information 123 is information on the inventory of each variation of each component. The component inventory information 123 is calculated by the inventory management device 200 and obtained by the controller 110 from the inventory management device 200 via the communicator 130. For a variation with an inventory of 0, a sold-out mark 317 is displayed on the customization screen described above.

Price information 124 is information on the default model of each product and the price of each variation of each component. For example, a case where a wristwatch with the model number "watch #2" comprises component A, component B and component C where the prices of these variations and the default model are as illustrated in FIG. 9 is described as an example.

In the example in FIG. 9, since the number in inventory of variation B-3 of component B is 0 in the inventory information 123, the variation B-3 is not available for purchase, but other variations are available for purchase. Here, it is assumed that the user has selected variation A-1 of component A, variation B-2 of component B, and variation C-2 of component C on the customization screen for watch #2. In this case, the controller 110 refers to the price information 124 and calculates 23,000 yen that is the price of the default model, 20,000 yen, plus the price of the selected variations (0+2,000+1,000), as the price of this customized model of watch #2.

Returning to FIG. 3, behavior history information 125 is information on the history of which products or components (variations) the user has viewed (how many times and how long they were viewed), selected (how many times they were selected), and/or ordered on the EC site.

Customization information 126 is information that indicates which variation is selected as a component of the customized model in each product model listed as illustrated in FIG. 4. In the case of a model customized by a specific entity such as a specific person (a designer, a celebrity, or the like) or a specific device (an artificial intelligence, or the like), the name of the specific entity (or identification (ID) that uniquely identifies the entity) is also stored as the customization information 126. For example, some designers may not allow changes from the variation they have selected. In such a case, for components for which changes to the selected variation are prohibited, information indicating that changes to the component are not allowed is also stored as part of the customization information 126.

Figure 10:
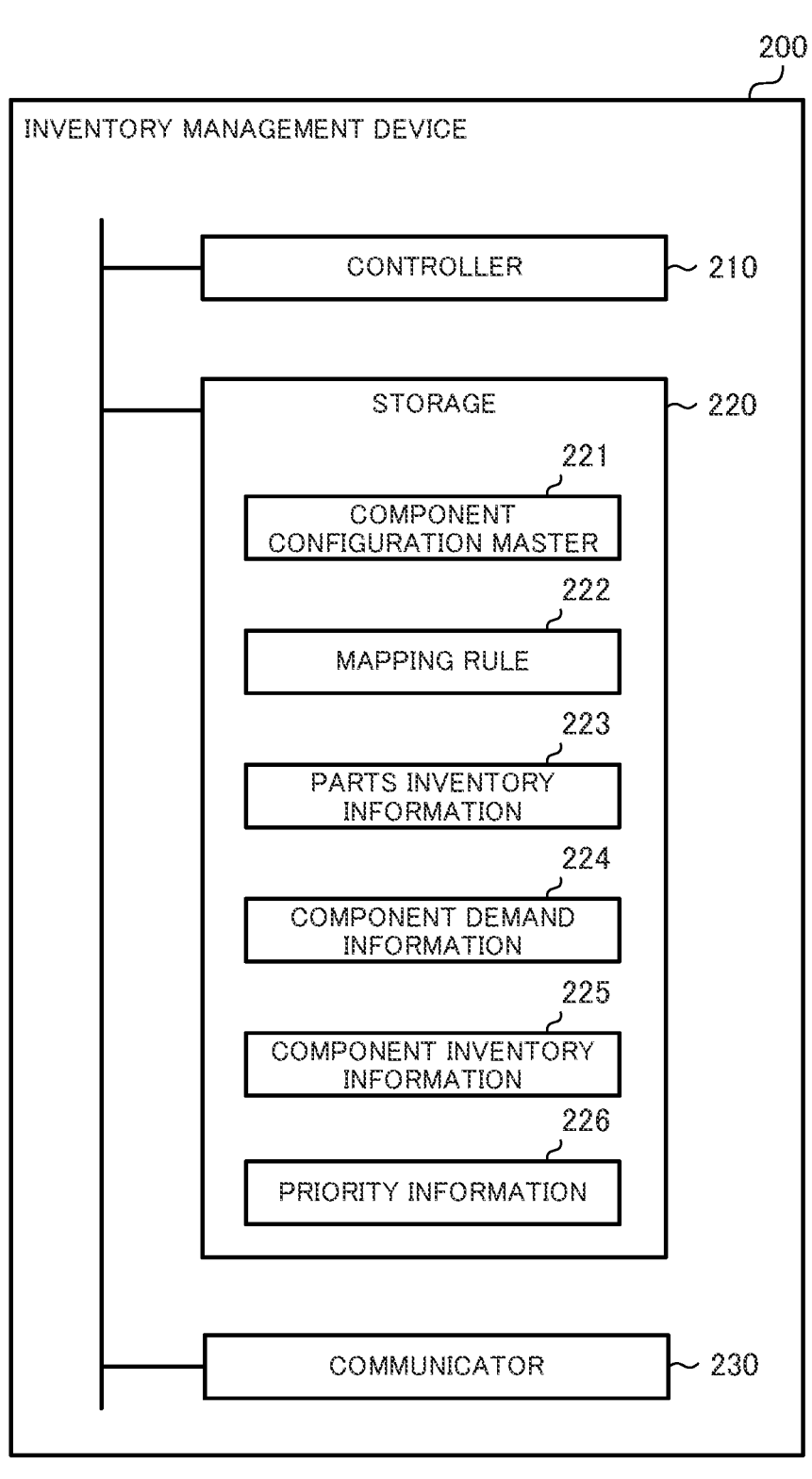
FIG. 10 is a diagram illustrating an example of the functional configuration of the inventory management device according to the present embodiment.

The following describes the inventory management device 200. The inventory management device 200 comprises a controller 210, a storage 220, and a communicator 230, as illustrated in FIG. 10, as its functional configuration.

The controller 210 comprises of a processor such as a CPU. The controller 210 executes inventory management processing and/or the like described below by means of a program stored in the storage 220.

The storage 220 stores a program to be executed by the controller 210 and necessary data. The storage 220 may include, but is not limited to, RAM, ROM, SSD, HDD, and/or the like.

The communicator 230 is a communication interface for the inventory management device 200 to transmit and receive data to and from the EC site device 100, the production management server 400, and/or the like.

Next, the various information stored in the storage 220 is described. A component configuration master 221 is information that indicates what parts each variation of each component comprises. For example, as illustrated in FIG. 11, the component configuration master of a glass component is information that indicates a list of parts that constitute each variation of the glass component.

A mapping rule 222 is a rule for extracting the component configuration master 221 from a bill of materials (a core system bill of materials) for each product stored in the production management server 400. Note that the bill of materials of each product stored in the production management server 400 is, as illustrated in FIG. 12, a tree structure representing the configuration of a product (in the example of FIG. 12, a wristwatch), with the parts that constitute the product arranged in sections corresponding to the leaves of the tree structure.

Although a node in this tree structure may happen to correspond to a component in the present embodiment, since the data stored in the production management server 400 is basically not specifically considered for product customization, conditions for associating a component with a part are generally required. The collection of these conditions is the mapping rule 222.

An example of the mapping rule 222, as illustrated in FIG. 13, specifically comprises conditions that identify a location in the bill of materials ("parent," "excluded-child"), exception conditions ("QTY ratio"), variation conditions ("subject to variation", "not subject to variation"), and/or the like.

Figure 12:
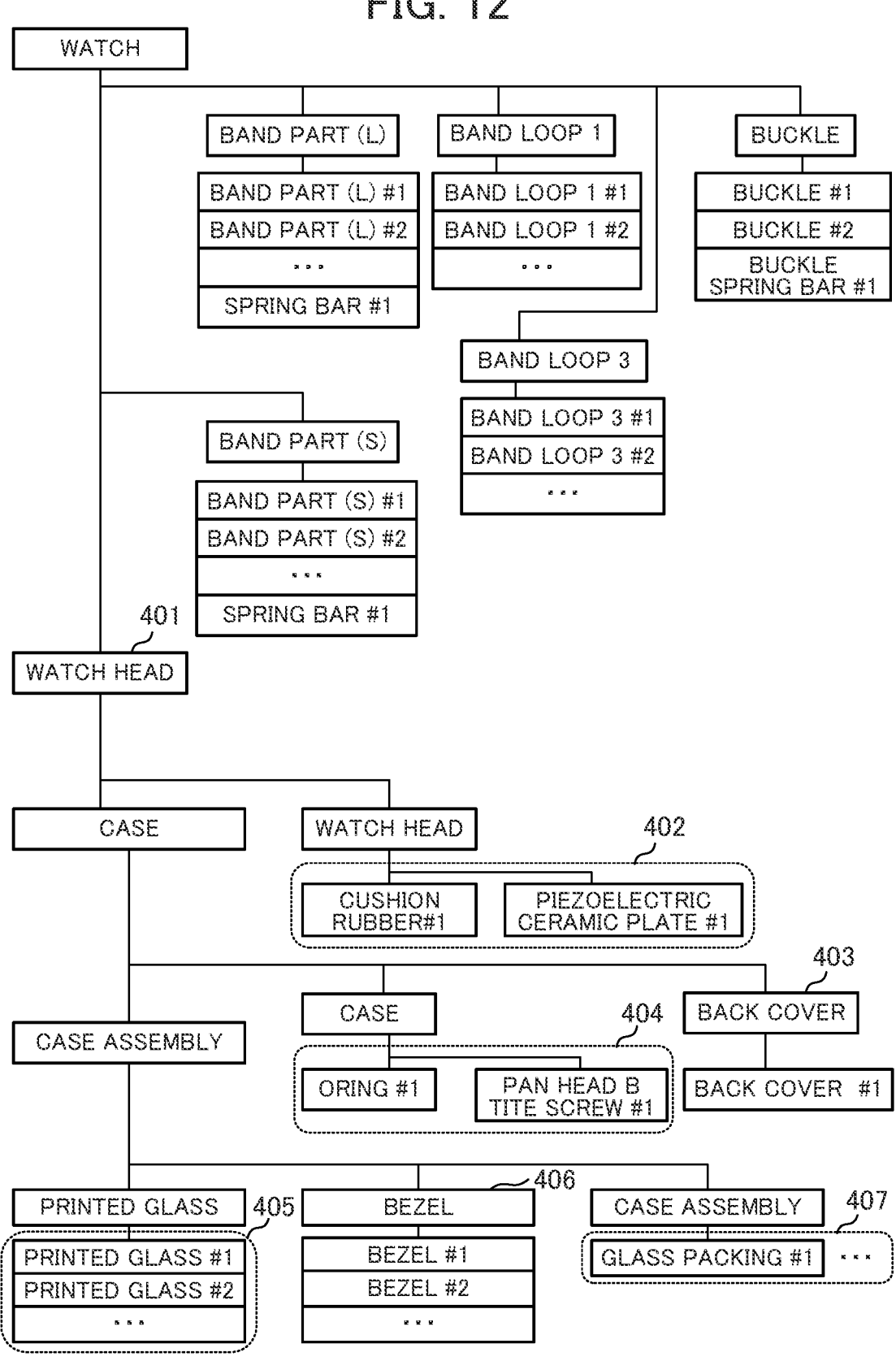
FIG. 12 is a diagram illustrating an example of a bill of materials stored in a production management server according to the present embodiment.

It can be seen that the glass component 560 is associated with the parts enclosed by dotted lines 402, 404, 405, and 407, since, according to FIG. 13, the back cover 403 and bezel 406 are excluded from the parts parented to the watch head 401 in the bill of materials illustrated in FIG. 12. Also, since "printed glass #*" is specified as subject to variation (* represents an arbitrary string in regular expression), it can be seen that the variation of the glass component 560 can be obtained by varying the printed glass.

Other components can also be associated with parts in the bill of materials in a similar manner. However, in the present embodiment, for the band loop component 540, there is a band loop 1 component consisting of one band loop and a band loop 3 component consisting of three thin band loops, where the band loop 3 component is configured by combining one band loop 3-1 component, one band loop 3-2 component, and one band loop 3-3 component. The QTY ratio of each of the band loop 3-1 component, band loop 3-2 component, and band loop 3-3 component is 1 to indicate this.

As described above, the mapping rule 222 allows the controller 210 to easily generate the component configuration master 221 from the bill of materials. The controller 210 then transmits the information of the generated component configuration master 221 to the production management server 400 via the communicator 230. The production management server 400 then receives (obtains) the information of the component configuration master 221 via the communicator mounted inside the chassis of the production management server 400 that is not illustrated in the drawings. The details of transmitting the information of the component configuration master 221 to the production management server 400 are described below.

Returning to FIG. 10, parts inventory information 223 is information on the inventory of each part, which is stored in the production management server 400 and obtained by the controller 210 via the communicator 230.

Component demand information 224 is information on the demand for a component that the EC site device 100 obtained from the user. This information may simply be information on the number of orders for the component, or it may be information that also anticipates future demand for the component based on the behavior history information 125 accumulated in the EC site device 100.

Component inventory information 225 is information on the number of available supplies of each component (component inventory) that is obtained through inventory management processing described below. The EC site device 100 periodically requests information on the current component inventory from the inventory management device 200 and updates the component inventory information 225.

Priority information 226 is information that is used, when calculating component inventory, to allocate parts preferentially to a component (a variation) that constitutes a product with high priority so as to prevent the component from becoming unavailable (out of stock). The priority information 226 is set so that the priority of a product or a component (a variation) constituting the product is increased, for example, when the product is a new product or some kind of limited edition model, when it is a product that supports an engraving service (engravable product), when it is a top-selling model in a certain sales period in the past (a best-selling product), or when it is a product that is in the promotion period (for example, 3 months) after a promotion release date (for example, a date of release on a SNS, website, or video, a start date of reservation, a release date) or during a predetermined period including the user's anniversary (for example, a birthday, a wedding anniversary) (for example, from one month before the anniversary to one week after the anniversary).

For example, when the product is some limited model, by using the priority information 226, the controller 210 can adjust the quantity of parts to be allocated to components that constitute the limited model to be greater than the quantity of parts to be allocated to components that constitute products other than the limited model. This can be done to prevent the limited model from running out of stock as much as possible.

When the product is a released product that is released on a promotion release date, by using the priority information 226, the controller 210 can adjust the quantity of parts to be allocated to the components that constitute the released product to be greater than the quantity of parts that constitute products other than the released product during a specified period after the promotion release date (for example, 3 months). This can be done to prevent the released product from running out of stock as much as possible.

When the product is an engravable product, by using the priority information 226, the controller 210 can adjust the quantity of the parts to be allocated to the components that constitute the engravable product to be greater than the quantity of the parts to be allocated to the components that constitute products other than the engravable product during a specified period. This can be done to prevent the engravable product from running out of stock as much as possible.

When the product is a best-selling product, by using the priority information 226, the controller 210 can adjust the quantity of parts to be allocated to components that constitute the best-selling product to be greater than the quantity of parts to be allocated to components that constitute a product other than the best-selling product during a specified period (for example, until the product is no longer the best-selling product). This can be done to prevent the best-selling product from running out of stock as much as possible.

With the functional configuration described above, the inventory management device 200 can obtain information on the inventory of parts from the production management server 400 and allocate each part to a component according to demand or according to demand and priority, thereby preventing out-of-stocks of components constituted by a plurality of parts as much as possible.

For example, it is assumed that component A is constituted by part $\alpha$, part $\beta$, and part $\gamma$, as illustrated in FIG. 14. Then, in this example, part $\gamma$ has only one type of part $\gamma$-1, but part $\alpha$ is selected from five types of parts $\alpha$-1 to $\alpha$-5 and part $\beta$ from three types $\beta$-1 to $\beta$-3, and component A has five types of variations A-1 to A-5. FIG. 14 illustrates that, in each variation of component A (A-1 to A-5), the parts corresponding to the field marked with a circle (for A-1, $\alpha$-1, $\beta$-1 and $\gamma$-1) constitute the variation.

In the example illustrated in FIG. 14, it is assumed that the number each part in inventory is 400, and that the numbers in demand for variations of the component are 400 for A-1, 160 for A-2, 120 for A-3, 80 for A-4, and 40 for A-5.

In this case, when parts are simply allocated to satisfy the demand for variation A-1, all 400 pieces of parts $\gamma$-1 would be allocated to variation A-1, so the number of variation A-1 available would be 400, while the number of other variations (A-2 to A-5) available would be 0. Such parts allocation is acceptable when the priority of variation A-1 is supposed to be high, such as when one wants to prevent out-of-stock of only variation A-1, but usually in most of the cases one wants to allocate parts equally to the other variations.

In order to allocate parts to each variation equally or according to priority, inventory allocation processing described below is performed. In this way, when all variations are treated with the same priority, parts are allocated in such a way that the numbers of available supplies of the variations (component inventory) would be 200 for A-1, 80 for A-2, 60 for A-3, 40 for A-4, and 20 for A-5. When, for example, only the priority of variation A-2 is higher than the other variations, and the priorities of the other variations than variation A-2 are the same, parts are allocated in such a way that the numbers of available supplies would be 150 for A-1, 160 for A-2, 45 for A-3, 30 for A-4, and 15 for A-5. Such parts allocation is performed in inventory management processing and parts allocation processing described below.

Figure 15:
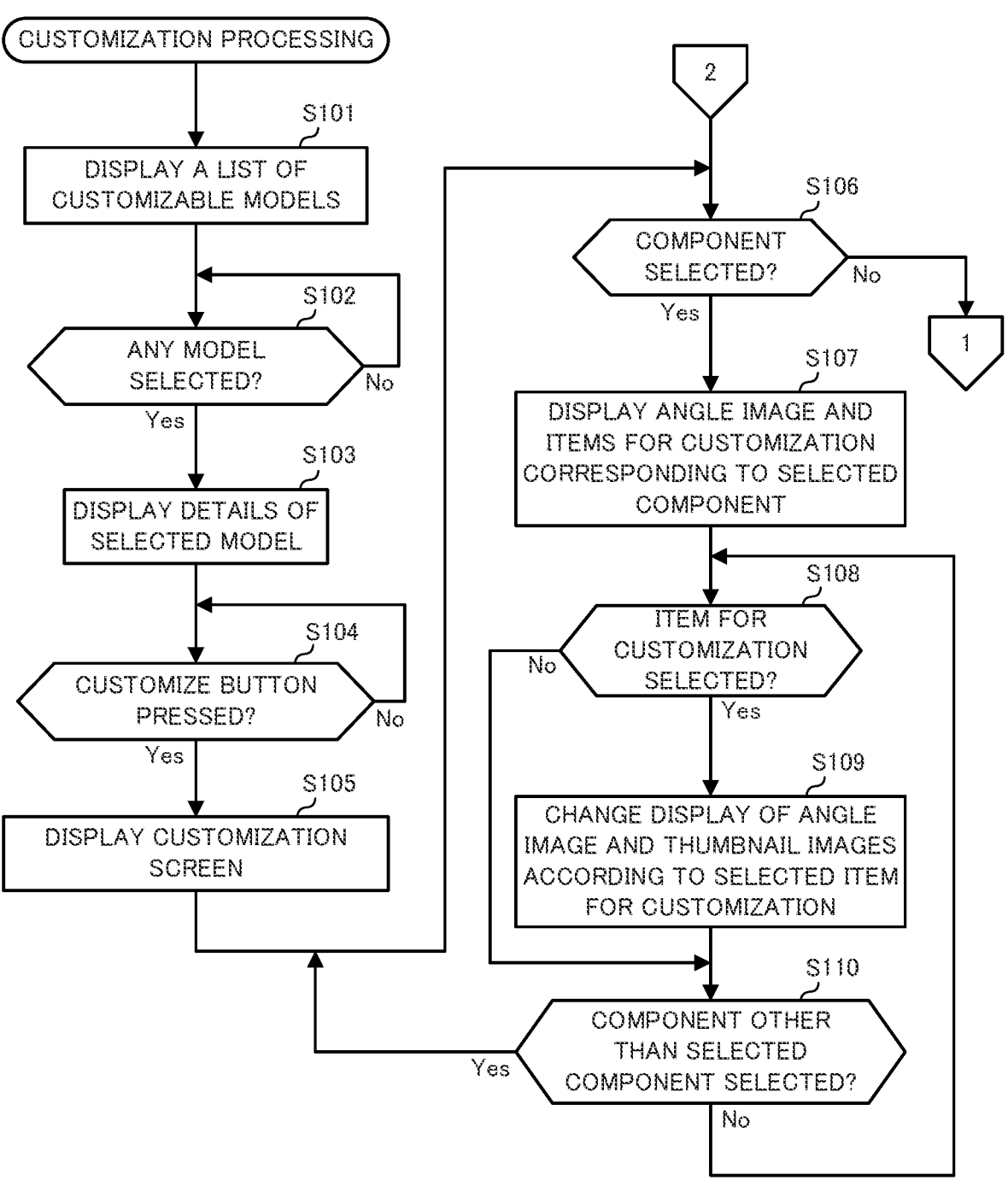
FIG. 15 is a first part of the flowchart of customization processing according to the present embodiment.
Figure 16:
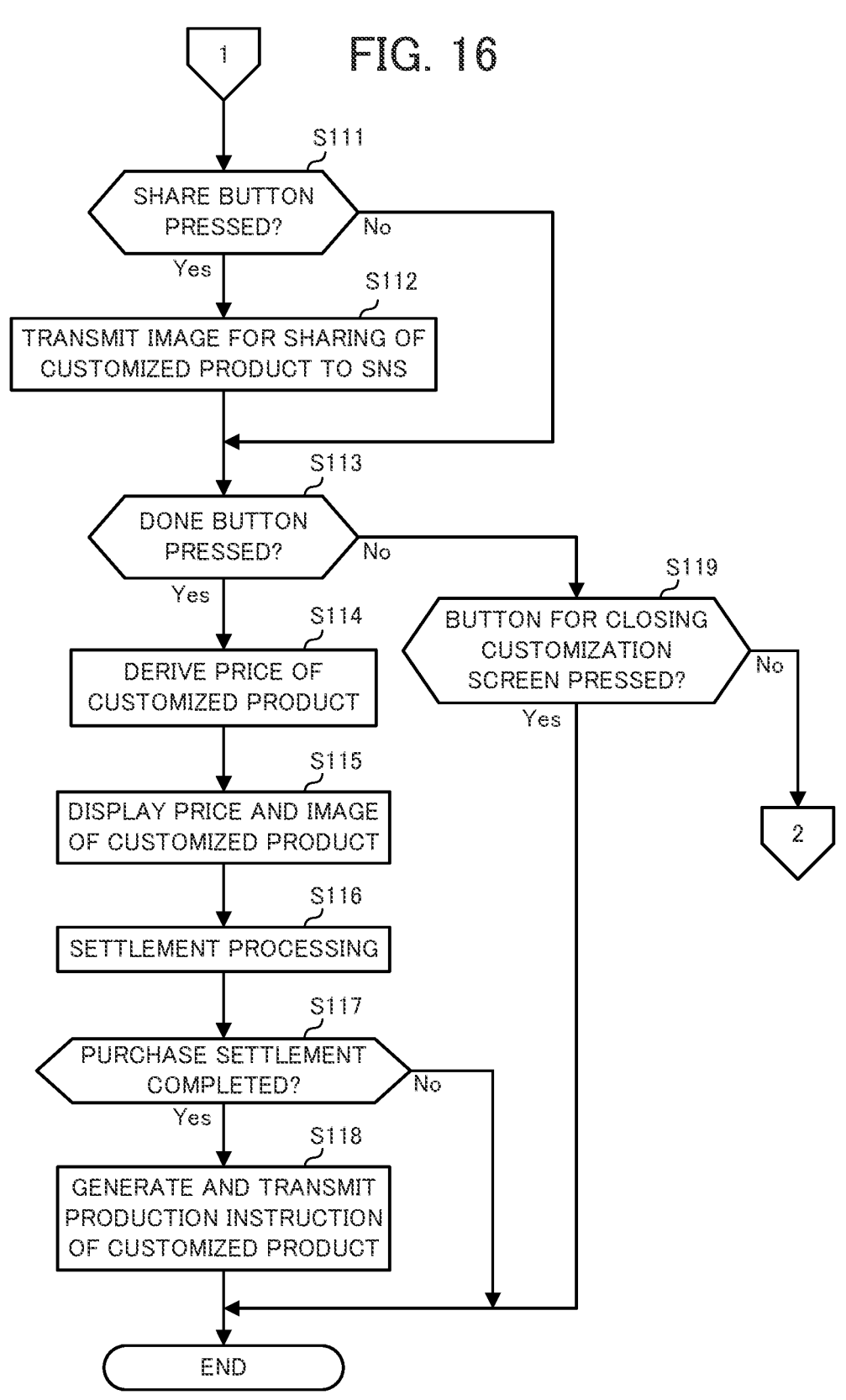
FIG. 16 is a second part of the flowchart of customization processing according to the present embodiment.

Next, with reference to FIGS. 15 and 16, customization processing executed by the controller 110 of the EC site device 100 is described. This processing is initiated when the user terminal 300 that is accessing an EC site provided by the EC site device 100 accesses a page that introduces a customizable product.

First, the controller 110 displays on the screen 310 of the user terminal 300 a list of customizable product models as a product model selection screen, as illustrated in FIG. 4 (step S101). The product models displayed here are the product models (base objects) subject to customization. Each component of the base object is in a state where a default or a variation selected by a specific entity (base specification) is selected. The list display of product models may list only the name of each product model (the model number or information that identifies the entity (a person or the like) who performed the customization), only the image of each product model, or both the name and image thereof.

In this list display, the controller 110 basically displays products with the same model number (a default model and various customized models) in a group. The order in which the controller 110 displays the product models within the group of products with the same model number is arbitrary, but a certain component may be used as a reference component and the product models may be listed in a group according to the properties (attributes) of the variations of this reference component. For example, by setting a bezel component as a reference component and grouping the parts that constitute the bezel component by color, material, and the like, the product models with bezels of the same color and bezels of the same material are arranged next to each other, making it easier to compare how the image of each product varies depending on the difference in a variation of the component other than the reference component.

The list may also be grouped by the entity that performed the customization. In this way, for example, the models customized by designer A are displayed in a group, making it easier to select for a user who wants to select a product model from among the models customized by a particular designer or celebrity. The models may also be displayed in groups by the type of entity that performed the customization. For example, the models customized by each type such as designer, athlete, celebrity, musical instrument player, or computer AI are displayed in groups. This allows easy comparison of the features of customizations by designers (for example, use of colors and color placement relationships) since a model customized by designer A and a model customized by designer B are displayed side by side.

Returning to FIG. 15, the controller 110 next determines whether any of the displayed product models has been selected (step S102). When none of the models has been selected (step S102; No), it returns to step S102.

When one of the models has been selected (step S102; Yes), the controller 110 displays detailed information on the selected model on the screen 310 of the user terminal 300 (step S103) as illustrated in FIG. 5. Although omitted in FIGS. 15 and 16 due to the complexity, the controller 110 treats the information on the selected model and components (variations) as information of an order that is being inquired (an order under inquiry) since the selected model may be ordered thereafter.

The controller 110 also accumulates information on which models and variations the user has viewed, selected, or purchased (information on viewing behavior (viewing time, the number of times viewed, and/or the like), selection behavior (the number of times selected, and/or the like), purchase history, and/or the like) as behavior history information 125 in the storage 120. Then, the controller 110 transmits the information of the order under inquiry and the behavior history information 125 to the inventory management device 200 as necessary (for example, before step S107). This allows the controller 110 to obtain the component inventory information 123 from the inventory management device 200.

Returning to FIG. 15, the controller 110 determines whether the customize button 311 has been pressed (step S104). When the customize button 311 has not been pressed (step S104; No), it returns to step S104. Although omitted in FIG. 15 due to the complexity, when, for example, a product model that is displayed in a small size at the upper right of the screen 310 illustrated in FIG. 5 is selected, the controller 110 returns to step S103 to display detailed information on the selected model.

When the customize button 311 has been pressed (step S104; Yes), the controller 110 displays a customization screen on the screen 310 of the user terminal 300, as illustrated in FIG. 6 (step S105). Then, the controller 110 determines whether any of the components 313 has been selected on the screen 310 illustrated in FIG. 6 (step S106).

When any of the components 313 has been selected (step S106; Yes), the controller 110 obtains an angle image (an effective angle image), from which the selected component (a focus component) can be effectively viewed, from the storage 120, and displays the angle image 312 (the effective angle image), items for customization 315, and the like on the screen 310 of the user terminal 300, as illustrated in FIG. 7 (step S107). When displaying the items for customization 315, the controller 110 refers to the inventory information 123 and displays a sold-out mark 317 as information indicating out of stock for the item for customization 315 corresponding to a variation with an inventory of 0. In addition to the angle image 312 (the effective angle image) and the items for customization 315, thumbnail images 314 may be displayed at step S107.

Although omitted in FIG. 15 due to the complexity of explanation, when the determination at step S106 is Yes, the controller 110 refers to the customization information 126 and, when the selected component 313 cannot be changed, the controller 110 proceeds to step S110 without proceeding to step S107. At that time, the controller 110 may display information on the screen 310 notifying that the component cannot be changed (for example, a message "cannot be changed").

The controller 110 then determines whether any of the items for customization 315 has been selected (step S108). When none of the items for customization 315 has been selected (step S108; No), the controller 110 proceeds to step S110.

When an item for customization 315 has been selected (step S108; Yes), the controller 110 changes the display of the angle image 312 and the thumbnail images 314 according to the selected item for customization 315 (step S109) and proceeds to step S110.

At step S109, the controller 110 refers to the component image information 121 as illustrated in FIG. 8, and, for each angle of the focused component currently selected as the target for customization, synthesizes the image material of the variation (the variation image) corresponding to the selected item for customization 315 (selected specification) into an angle image 312 and thumbnail images 314. As a result, the display mode of the focused component in the angle image 312 and thumbnail images 314 is changed to the display mode of the image material of the selected specification (the selected specification image), allowing the user to check the image of the customized model with the changed variation.

Then, at step S110, the controller 110 determines whether another component 313 other than the component 313 selected at step S106 has been selected. When no such component 313 has been selected (step S110; No), the controller 110 returns to step S108.

When a component 313 other than the component 313 selected at step S106 has been selected (step S110; Yes), the controller 110 returns to step S106.

On the other hand, when none of the components 313 has been selected at step S106 (step S106; No), the controller 110 determines whether the share button 319 has been pressed (step S111). When the share button 319 has not been pressed (step S111; No), the controller 110 proceeds to step S113.

When the share button 319 has been pressed (step S111; Yes), the controller 110 transmits the image for sharing of the customized product (information on the image for sharing) to the SNS and/or the like (step S112) and proceeds to step S113. The destination of the image for sharing (the image for transmission) at step S112 is not limited to a specific SNS. Depending on the destination setting, the controller 110 can transmit the image for sharing to an arbitrary external device.

At step S112, the controller 110 may display the image for sharing on the screen 310 of the user terminal 300 and transmit it to the SNS after confirmation by the user, instead of directly transmitting the image for sharing to the SNS. The controller 110 may also display a download button along with the image for sharing on the screen 310 and have the image for sharing downloaded to the user terminal 300 when the download button is pressed. In this case, the user is enabled to post the image for sharing to the SNS or the like from the user's device, such as the user terminal 300, that downloaded the image for sharing.

At step S113, the controller 110 determines whether the done button 318 has been pressed. When the done button 318 has been pressed (step S113; Yes), the controller 110 derives the price required to purchase the customized product (step S114) and displays the price and angle image of the customized product on the screen 310 (step S115). At that time, the controller 110 may display a plurality of angle images on the screen 310 side by side so that the customized product can be viewed and confirmed from various angles.

The controller 110 then performs settlement processing (step S116) and determines whether the purchase settlement has been completed (step S117). When the purchase settlement has not been completed (step S117; No), the controller 110 ends the customization processing. This is a case where the user has customized the product but did not end up purchasing it.

When the purchase settlement has been completed (step S117; Yes), the controller 110 generates a production instruction, to which information on at least one of the angle images (the effective angle image) and plurality of thumbnail images of the customized product and a list of parts are outputted, and transmits the production instruction to the production management server 400 (step S118), then completes the customization processing. Note that when the purchase settlement has been completed, the contents of this order are finalized, so the controller 110 treats the order as a confirmed order, and thereafter, transmits the information to the inventory management device 200 as information of a confirmed order, if necessary.

Note that, when the production management server 400 receives the production instruction transmitted at step S118 as a manufacturing request, the production management server 400 expands the information on the a variation (a selected specification) of each component of the customized product described in the production instruction into parts on the bill of materials (a core system bill of materials) base on the information the component configuration master 221 transmitted as appropriate from the inventory management device 200. The production management server 400 then gives a manufacturing instruction of the customized product using the expanded information on the parts.

On the other hand, when the done button 318 has not been pressed (step S113; No), the controller 110 determines whether the button to close the customization screen has been pressed (step S119). When the button to close the customization screen has not been pressed (step S119; No), the controller 110 returns to step S106. When the button to close the customization screen has been pressed (step S119; Yes), the controller 110 terminates the customization processing.

The above customization processing allows a user to customize a product as they like by selecting their preferred model from the product model selection screen, and then to order or share the product on an SNS and/or the like. The product model selection screen also displays a base object customized by a specific entity, and by selecting this base object, a user can customize the product based on the one customized by the specific entity other than the user. Thus, the EC site device 100 functions as a customizing device.

In addition, the customization screen displays an effective angle image that effectively makes a component visible according to the component selected by a user, so that the EC site device 100 functions as a display control device to display the component selected by the user in an easy-to-understand manner.

Figure 17:
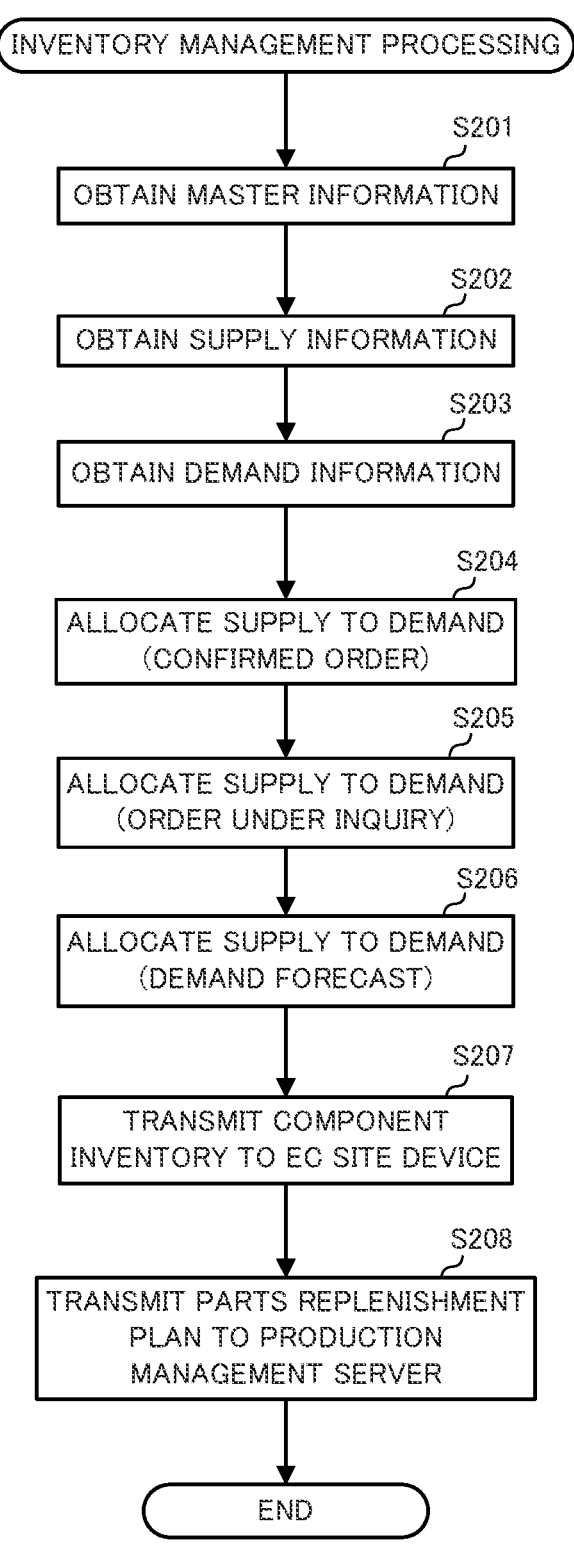
FIG. 17 is a flowchart of inventory management processing according to the present embodiment.

Next, referring to FIG. 17, the inventory management processing executed by the controller 210 of the inventory management device 200 is described. The inventory management processing can be executed at any timing. For example, when the EC site device 100 requests information on component inventory, the controller 210 starts the inventory management processing.

First, the controller 210 obtains master information (step S201). The master information is, for example, the component configuration master 221. The controller 210 obtains the bill of materials for each product from the production management server 400 via the communicator 230 at step S201 and generates the component configuration master 221 based on the mapping rule 222. The controller 210 also obtains necessary master information other than the component configuration master 221 at step S201. However, since the master information is not updated frequently, the controller 210 may skip step S201 when it is clear that all the master information has not been changed. The controller 210 may also obtain the master information (for example, obtain the bill of materials and update the component configuration master) at arbitrary timing prior to performing the inventory management processing.

Although omitted in FIG. 17 because of the complexity, the controller 210 transmits the information of the component configuration master 221 generated at step S201 to the production management server 400 via the communicator 230. When the controller 210 updates the component configuration master 221 at arbitrary timing other than step S201, the controller 210 transmits the information of the component configuration master 221 to the production management server 400 after the update is completed. This is to ensure that the production management server 400 obtains in advance the information of the component configuration master 221 to be used when conducting a manufacturing instruction for the customized product as described above.

Next, the controller 210 obtains supply information from the production management server 400 (step S202). The supply information is, for example, the actual number of parts in inventory or the number of remaining orders, and is obtained from the production management server 400 via the communicator 230.

Then, the controller 210 obtains demand information from the EC site device 100 (step S203). The demand information is, for example, data relating to demands, such as confirmed orders (orders that have been confirmed at the EC site device 100), orders under inquiry (orders that are being inquired at the EC site device 100 but have not yet been confirmed), demand forecasts (demand forecasts based on the behavior history information 125 accumulated in the EC site device 100, demand forecasts due to the release of new products or limited products (limited models), demand forecasts due to the release of product promotions by celebrities and/or the like on a SNS and/or the like, and demands based on marketing strategies and/or the like).

Next, the controller 210 performs the processing of allocating supplies to each demand based on the demand information and supply information where the controller 210 allocates the supplies in order according to the type of demand information (confirmed order, order under inquiry, or demand forecast).

First, the controller 210 allocates the parts necessary to produce a product for which a confirmed order has been accepted (step S204). Note that, when a purchase is being accepted by the EC site device 100, if any part constituting the product is 0 in inventory, a sold-out mark 317 or the like is displayed on the screen 310 so that no confirmed order is accepted, thereby ensuring that out-of-stock of parts never happen even when all parts necessary to produce the product for which a confirmed order has been accepted are allocated.

Next, the controller 210 allocates the number of supplies of parts remaining after allocation is made for the confirmed order (confirmed order allocation balance) to the parts necessary to produce a product corresponding to an order under inquiry (step S205). Details of this processing (parts allocation processing) are described later.

Next, the controller 210 allocates the number of supplies of parts remaining after allocation is made for the order under inquiry (order under inquiry allocation balance) to the parts necessary to produce a product corresponding to a demand forecast (step S206).

Next, the controller 210 calculates the number of available components based on the quantity of parts allocated at steps S205 and S206, and transmits the number of available components to the EC site device 100 as component inventory (step S207).

Then, the controller 210 transmits a parts replenishment plan (shortage quantity) to the production management server 400 to fill the quantity of parts that could not be allocated at steps S205 and S206 (step S208), and ends the inventory management processing.

This inventory management processing allows the inventory management device 200 to appropriately calculate the component inventory and transmit it to the EC site device 100. In the event of parts running out of stock, the shortage can be transmitted as a parts replenishment plan to the production management server 400.

Next, referring to FIG. 18, the parts allocation processing performed at step S205 of the inventory management processing is described. In the description, the component demand and the number of parts in inventory illustrated in FIG. 14 are used as specific demand and supply.

First, the controller 210 calculates the dependent demand number of parts based on the component demand (step S301). The dependent demand number is the quantity of parts required to satisfy the component demand. For example, in FIG. 14, part B-1 is used in A-1 and A-2 that are variations of component A. The component demands for A-1 and A-2 are 400 and 160, respectively, so the dependent demand number of part $\beta$-1 is 400+160=560.

Next, the controller 210 refers to priority information 226 to determine whether a variation with high priority exists (step S302). When no high priority variation exists (step S302; No), then all the variations are targeted, and the number of available parts for allocation is set for all parts constituting the target variations in the following steps S305 to S307 (step S303), then the processing proceeds to step S305.

On the other hand, when a variation with high priority exists (step S302; Yes), then variations with the same priorities are targeted in turn starting from the variation with the highest priority, and the number of available parts for allocation is set for all parts constituting the target variations in the following steps S305 to S307 (step S304), then the processing proceeds to step S305.

At step S305, the controller 210 determines for each part whether the dependent demand number is less than the number in inventory. When the dependent demand number for a part is less than the number in inventory (step S305; Yes), the controller 210 sets the number of available parts for allocation for that part as the dependent demand number (step S306) and proceeds to step S308. For example, in FIG. 14, the dependent demand number for part $\alpha$-2 is 160 and the number in inventory is 400, so the number of available parts for allocation for part $\alpha$-2 is 160.

On the other hand, when the dependent demand number is equal to or greater than the number in inventory (step S305; No), the controller 210 sets the number of available parts for allocation for that part as the number in inventory$\times$ the ratio of the component demand according to the ratio of the component demand (step S307) and proceeds to step S308. For example, when the priorities of A-1 to A-5 are all the same (equal) in FIG. 14, the dependent demand number for part $\gamma$-1 is 800 and the number of parts $\gamma$-1 in inventory is 400, so the number in inventory is distributed according to the ratios of component demands, and the numbers of available parts $\gamma$-1 for allocation to A-1 to A-5 (with the ratios of component demands 10:4:3:2:1) are 200, 80, 60, 40, and 20, respectively.

For example, when only the priority of A-2 is high and the priorities of other A-1, A-3, A-4, and A-5 are all the same (equal) in FIG. 14, then, since the portion corresponding to A-2 out of the dependent demand number for part $\gamma$-1, 800, is 160 and the number of parts $\gamma$-1 in inventory is 400, the determination at step S305 is Yes, and the number of parts $\gamma$-1 available for allocation to A-2 is the dependent demand number 160. For the remaining A-1, A-3, A-4, and A-5, the dependent demand number for part $\gamma$-1 is 640 that is 800 minus 160 (the portion for A-2), and the inventory is 240 since 160 parts are allocated to A-2 from the inventory of the part $\gamma$-1 400. Thus, the determination at step S305 is No, and the numbers of parts $\gamma$-1 available for allocation to A-1, A-3, A-4, and A-5 (with the ratios of component demands 10:3: 2:1) are 150, 45, 30, and 15, respectively, by distributing the number in inventory 240 according to the ratios of component demands, 10:3:2:1.

Then, at step S308, the controller 210 sets the minimum value among the numbers of parts available for allocation for parts constituting the component as the available number of supplies of the component and ends the parts allocation processing. For example, in the above example, whether when the priorities of A-1 to A-5 are all the same (equal) or when only A-2 has a higher priority, the minimum number of parts available for allocation is the number of parts $\gamma$-1 available for allocation, and the number of parts $\gamma$-1 available for allocation becomes the available number of supplies for each variation, that is, the component inventory.

As a result, the parts allocation processing described above allows optimal parts allocation to each component based on supply and demand. For a component for which the available number of supplies becomes 0 at step S308, the controller 210 can identify the component as an out-of-stock component (a component that is likely to become unavailable for supply).

Note that the parts allocation processing may have two processing modes: a demand mode that uses only demand information without using priority information 226, and a priority mode that uses not only demand information but also priority information 226. These two modes may then be selectable by the administrator of the inventory management device 200. In this case, the determination at step S302 is always No in the demand mode, and there is no need to use priority, thus lightening the load on the parts allocation processing.

In addition, when the priority information 226 includes information on the priority usage time that is the time when priority information 226 should be used (for example, a release date of a new product or limited edition model, a product information release date on a website or the like, a promotion release date of a new product or limited edition model using a SNS or the like, and/or a promotion period (start date to end date) of a certain product), the controller 210 may refer to the priority information 226 and automatically switch the processing mode from the demand mode to the priority mode when the current date and time falls within a predetermined period that includes the priority usage time (the priority usage period), and automatically switch the processing mode from the priority mode to the demand mode when the current date and time is not in the priority usage period. Here, the priority usage period is a predetermined period of time that includes the priority usage time that is, for example, a predetermined period of time (for example, 3 months) that includes the release date, the product information release date, the promotion release date or the like. For example, when the priority usage time has a fixed duration, such as a promotion period, such a priority usage time is also included in the priority usage period.

As processing to switch the processing mode using the priority usage period, the controller 210 may determine whether there is a product that has entered the priority usage period including the priority use time included in the priority information 226, and when the controller 210 determines that there is a product that has entered the priority usage period, the controller 210 may adjust the quantity of parts in the priority mode, and when the controller 210 determines that there is no product that has entered the priority usage period, the controller 210 may adjust the quantity of parts in the demand mode. For example, the controller 210 may automatically switch from the demand mode to the priority mode at a predetermined time on the release date of a new product, and switch from the priority mode to the demand mode once the controller 210 determines that a predetermined period (for example, 3 months) has passed since the release date. By automatically switching the processing mode in this way, the administrator of the inventory management device 200 can eliminate the need to select the processing mode, and, for example, the processing mode is automatically switched to the priority mode on the release date of a new product for efficient priority allocation of parts.

Figure 19:
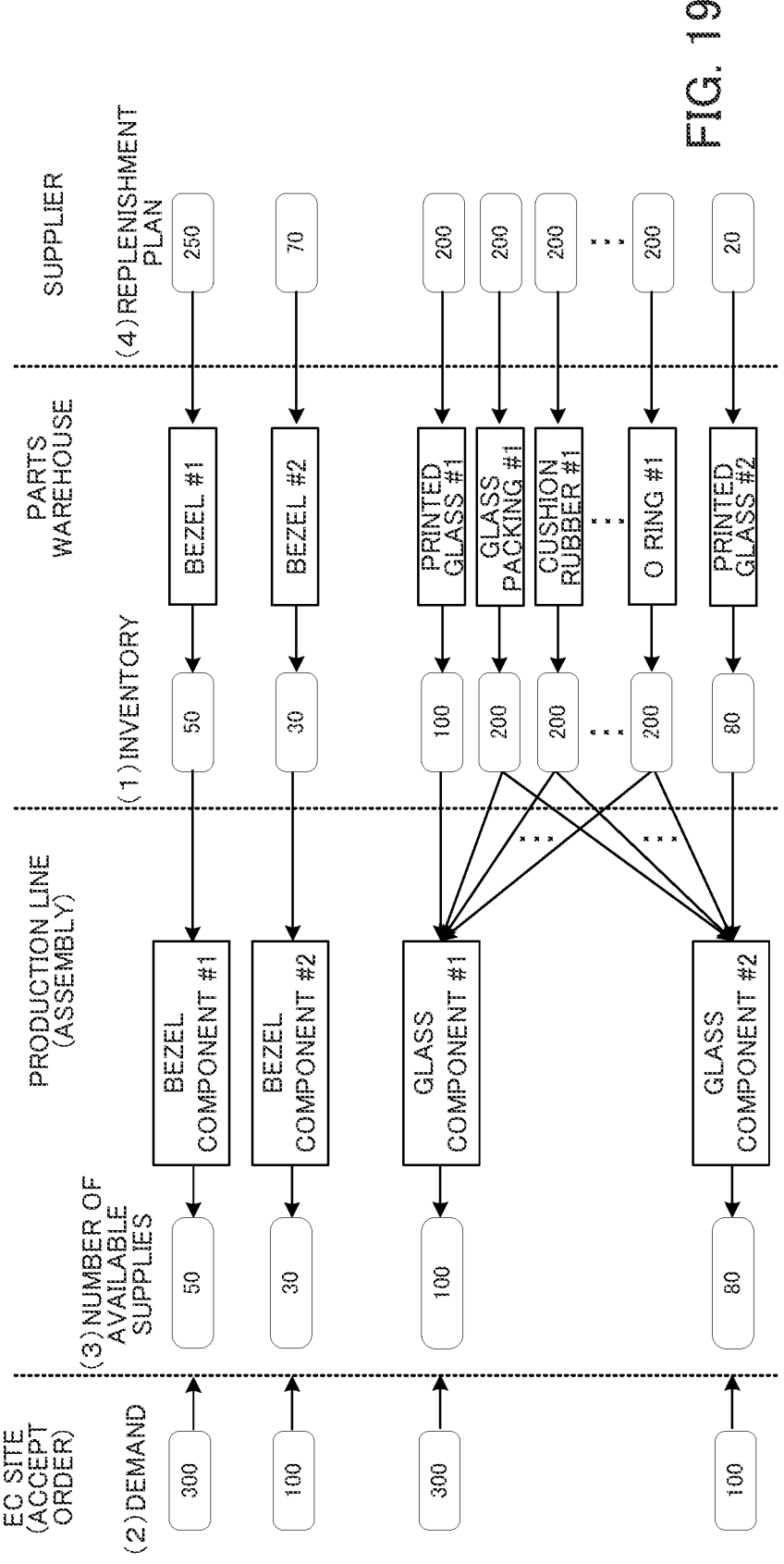
FIG. 19 is a diagram illustrating a specific example of the inventory management processing and parts allocation processing according to the present embodiment.

Next, a specific example of the inventory management processing is described with reference to FIG. 19. As illustrated in FIG. 19, this example assumes that the inventory of each part exists in the parts warehouse for the number of pieces indicated in "(1) Inventory" and that there are orders under inquiry from the EC site device 100 for the number indicated in "(2) Demand" for each variation of the components. For the sake of brevity of explanation, in this example, the priorities of the variations are assumed to be the same, and no consideration is given to confirmed orders or demand forecasts (each of which is 0).

First, at step S201 of the inventory management processing (FIG. 17), the controller 210 generates a component configuration master from the bill of materials obtained from the production management server 400 based on the mapping rule 222.

Then, at step S202, the controller 210 obtains, as supply information, the number of parts in inventory ("(1) Inventory" illustrated in FIG. 19) from the production management server 400. Then, at step S203, the controller 210 obtains, as demand information, the order under inquiry ("(2) Demand" illustrated in FIG. 19) from the EC site device 100.

In this example, there are 0 confirmed orders, so step S204 is effectively skipped. However, when there is a confirmed order, the inventory is allocated to the confirmed order.

Then, at step S205, the controller 210 allocates the number in inventory to the order under inquiry, which processing is done in the parts allocation processing (FIG. 18).

For a bezel component, since the bezel is the only component that makes up the bezel component, "the dependent demand number=the component demand ((2) Demand)" at step S301. In addition, since there are no high priority variations, the determination at step S302 is No, and the number of available parts for allocation is set for all parts that constitute the bezel component (that is, the bezel) by processing at steps S305 to S307 (step S303). For the bezel, the determination at step S305 is No since the dependent demand number>the number in inventory, and the ratio is all 100% because there are no parts shared among different variations. Therefore, at step S307, the number of bezels in inventory ((1) Inventory) is the number of bezels that can be allocated as it is. Then, since the bezel component is constituted by only a bezel, the number of parts available for allocation becomes the number of available supplies of the component as it is, as indicated in "(3) Number of available supplies" in FIG. 19 (step S308).

For a glass component, among the parts that constitute this component, "the dependent demand number=the component demand ((2) Demand)" for the printed glass and the ratio is 100%. Since the other parts are commonly used in the two variations, "the dependent demand number=the sum of component demands ((2) Demand)=400" and the ratios are the same between the two variations so they are both 50%. Since the dependent demand number>the number in inventory in both variations, the determination at step S305 is No. Therefore, at step S307, for the printing glass, the number in inventory ((1) Inventory) becomes the number of parts available for allocation as it is (that is, 100 for printing glass #1 and 80 for printing glass #2), and for the other parts, 50% of the number in inventory (that is, 100) becomes the number of parts available for allocation. At step S308, the minimum value among the available number of parts for allocation to each component is set as the available number of supplies for the component, so the available number of supplies for glass component #1 is 100 and the available number of supplies for glass component #2 is 80, as indicated in "(3) Available Number of Supplies" in FIG. 19.

In this example, there are 0 demand forecasts, so step S206 is effectively skipped. In this example, all the bezels and printed glass in inventory have been allocated at step S205, so even when there is a demand forecast, the bezels and printed glass cannot be allocated at step S206. Only 20 each remain for the parts that constitute the glass component other than the printed glass, but these parts remain as they are because the glass component cannot be made up without the printed glass. When the component can be made up of the unallocated parts and there is a demand forecast, then the parts are allocated to the demand forecast at step S206.

Then, at step S207, the component inventory, that is, the number of available supplies of each component calculated at step S205, is transmitted to the EC site device.

In the example illustrated in FIG. 19, the component inventory ((3) Number of available supplies) is smaller than the component demand ((2) Demand), because the number of parts in inventory ((1) Inventory) is small. Therefore, at step S208, the controller 210 calculates the number of parts in short and transmits it to the production management server 400 as a parts replenishment plan.

In this example, all bezels and printed glass have been allocated, so "(2) Demand–(3) Number of available supplies" is the quantity of parts that are in short. However, since there are still 20 parts each that have not been allocated among the parts that constitute the glass component other than the printed glass, "(2) Demand (300+100)–(3) Number of available supplies (100+80)–Quantity of unallocated parts (20)=200" is the quantity of parts that are in short. Therefore, the controller 210 transmits the quantity indicated in "(4) Replenishment plan" in FIG. 19 to the production management server 400 as a parts replenishment plan.

As explained above, the inventory management device 200 can prevent components from running out of stock as much as possible based on demand or priority, and can also create a replenishment plan when an out-of-stock is expected to occur.

Variant

Although the above-mentioned embodiment assumes that the user accesses the EC site provided by the EC site device 100 through a web browser from the user terminal 300 to perform the customization processing, the customization processing is not limited to such a mode. For example, a dedicated application program for accessing the EC site without using a web browser may be installed in the user terminal 300, and the customization processing may be executed by accessing the EC site through this dedicated application program.

In the above embodiment, although a digital watch is described as an example of a product model (a base object) that can be customized by a user on the EC site, an object to be customized is not limited to a digital watch. For example, in place of or in addition to a digital watch, an analog watch or a combination of analog and digital watch (a watch that displays the time on a large analog display using the hour and minute hands on the watch face with an opening of an arbitrary size at an arbitrary position in the watch face, through which a digital display using liquid crystal or the like displays the time and/or the like) may also be used as a customizable product model (a base object). In addition, the EC site may allow customization of an arbitrary object having a plurality of arbitrary components, not limited to watches.

For example, when an analog watch is added as a customizable object on the EC site, components constituting the analog watch are required. For example, components for an analog watch may include a bezel component, a dial component, a short band component, a long band component, an hour hand, minute hand, second hand component, a buckle component, a band loop component, a crown component, and the like. In this case, at step S201 of the inventory management processing, the controller 210 of the inventory management device 200 obtains the bill of materials for each product from the production management server 400 and generates a component configuration master 221 based on the mapping rule 222 that is updated to adopt the analog watch. Thereafter, by performing the processing of steps S202 to S208 of FIG. 17 in a similar manner, the inventory of each component for the analog watch can be obtained and transmitted to the EC site device 100.

To perform customization on the EC site, an image material (a variation image) of each variation for each angle of each component is stored in the component image information 121 of the EC site device 100, and information indicating which component's image material is composited to produce an angle image of the analogue wristwatch product is stored in the angle image information 122. For a combination of analog and digital watch and other objects, the controller 110 and the controller 210 can perform similar customization processing and inventory management processing by preparing a mapping rule 222, component image information 121, and angle image information 122 corresponding to the components that constitute the combination of analog and digital watch and other objects. This makes it possible for a user to customize an arbitrary object (an analog watch, a combination watch, or the like) at a user terminal 300.

Although, in the above embodiment, the above example is mainly for customizing the appearance of an object, properties subject to customization are not limited to the appearance of the object.

Both the EC site device 100 and the inventory management device 200 can also be realized by an ordinary PC or other computer. Specifically, in the above embodiment, it is assumed that the program to be executed by the controller 110 of the EC site device 100 is stored in the storage 120 in advance, and the program to be executed by the controller 210 of the inventory management device 200 is stored in the storage 220 in advance. However, the program can be stored and distributed in a flexible disk, a compact disc read only memory (CD-ROM), a digital versatile disc (DVD), a magneto-optical disc (MO), a memory card, a USB memory, or the like. Then a computer may be configured to execute each of the above processing by reading and installing the program on the computer.

Therefore, by having the user terminal 300 store a similar program and data as those stored in the EC site device 100, the user terminal 300 may function as the EC site device 100 (the display control device and the customizing device). In addition, the user terminal 300 and the EC site device 100 may share and store the necessary data, so that the customization processing described above is executed in cooperation with the controller of the user terminal 300 and the controller 110 of the EC site device 100. For example, the controller of the user terminal 300 may display an image on the display of the user terminal 300 during customization, and the controller 110 of the EC site device 100 may communicate with the inventory management device 200 and the production management server 400.

Furthermore, the program can be superimposed on a carrier wave and applied via a communication medium such as the Internet. For example, the program may be posted and distributed on a bulletin board system (BBS) on a communication network. The program can then be activated and executed under the control of the operating system (OS) in a similar manner as other application programs to perform each of the above processing.

The controller 110 and the controller 210 may comprise an arbitrary processor unit, such as a single processor, a multiprocessor, or a multi-core processor, as well as, a combination of any of such an arbitrary processor and a processing circuit, such as an application-specific integrated circuit (ASIC) or a field-programmable gate array (FPGA).

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-171234, filed on Oct. 19, 2021, the entire disclosure of which is incorporated by reference herein.

INDUSTRIAL APPLICABILITY

The present disclosure is applicable to an inventory management method, a program, and an inventory management device that can identify a component that may become out of supply based on the demand for each component in an object having a plurality of components.

REFERENCE SIGNS LIST

100 EC site device
110, 210 Controller
120, 220 Storage
121 Component image information
122 Angle image information
123 Component inventory information
124 Price information
125 Behavior history information
126 Customization information
130, 230 Communicator
200 Inventory management device
221 Component configuration master
222 Mapping rule
223 Parts inventory information
224 Component demand information
225 Component inventory information
226 Priority information
300 User terminal
310 Screen
311 Customize button
312 Angle image 313 Component
314 Thumbnail image
315 Item for customization
316 Check mark
317 Sold-out mark
318 Done button
319 Share button
400 Production management server
401 Watch head
402, 404, 405, 407 Dotted line
403 Back cover
406 Bezel
500 Wristwatch
510, 510A, 510B, 510C Band(S) component
511 Band(S)
512 Spring bar
520 Band (L) component
530 Buckle component
540 Band loop component
550 Bezel component
560 Glass component
1000 Product customization system

The invention claimed is:

1. An inventory management method to be implemented by an inventory management device including at least one processor, the inventory management method comprising:
   obtaining, by the at least one processor, a number of parts in inventory for each of a plurality of parts constituting a component of an object;
   generating, by the at least one processor, a component configuration master by applying a plurality of mapping rules to a bill of materials, wherein:
      the plurality of mapping rules define extraction and association conditions for identifying a correspondence relationship between a plurality of the component and the plurality of parts in the bill of materials; and
      the component configuration master is information indicating, for each component, constituent parts among the plurality of parts and quantities thereof required to configure the component;
   obtaining, by the at least one processor, a number of available supplies of each of the plurality of the component based on the generated component configuration master and the number of parts in inventory;
   obtaining, by the at least one processor, demand data for each of a plurality of the component based on a behavior history, obtainable by an operation on a user terminal, of a user with regard to the object; and
   identifying, by the at least one processor, a component that is likely to become out of supply among a plurality of the component based on the number of available supplies and the demand data.

2. The inventory management method according to claim 1, wherein the at least one processor obtains the bill of materials at a certain timing and updates the component configuration master.

3. The inventory management method according to claim 1, wherein the behavior history includes viewing behavior or selection behavior, by the user, of the component constituting the object.

4. The inventory management method according to claim 3, wherein the viewing behavior includes a viewing duration and a number of times viewed, and the selection behavior includes a number of times selected.

5. The inventory management method according to claim 1, wherein the behavior history includes a purchase history of the object having a plurality of the component.

6. The inventory management method according to claim 1, wherein the object is a watch, and the component includes a bezel and a band.

7. A non-transitory computer-readable recording medium storing a program, the program causing a computer of an inventory management device to execute processing comprising:
   obtaining a number of parts in inventory for each of a plurality of parts constituting a component of an object;
   generating a component configuration master by applying a plurality of mapping rules to a bill of materials, wherein:
      the plurality of mapping rules define extraction and association conditions for identifying a correspondence relationship between a plurality of the component and the plurality of parts in the bill of materials; and
      the component configuration master is information indicating, for each component, constituent parts among the plurality of parts and quantities thereof required to configure the component;
   obtaining a number of available supplies of each of the plurality of the component based on the generated component configuration master and the number of parts in inventory;
   obtaining demand data for each of a plurality of the component based on a behavior history, obtainable by an operation on a user terminal, of a user with regard to the object; and
   identifying a component that is likely to become out of supply among a plurality of the component based on the number of available supplies and the demand data.

8. An inventory management device comprising:
   a memory storing a program; and
   at least one processor to execute the program, wherein the at least one processor is configured to:
      obtain a number of parts in inventory for each of a plurality of parts constituting a component of an object;
      generate a component configuration master by applying a plurality of mapping rules to a bill of materials, wherein:
         the plurality of mapping rules define extraction and association conditions for identifying a correspondence relationship between a plurality of the component and the plurality of parts in the bill of materials; and
         the component configuration master is information indicating, for each component, constituent parts among the plurality of parts and quantities thereof required to configure the component;
      obtain a number of available supplies of each of the plurality of the component based on the generated component configuration master and the number of parts in inventory;
      obtain demand data for each of a plurality of the component based on a behavior history, obtainable by an operation on a user terminal, of a user with regard to the object; and
      identifies identify a component that is likely to become out of supply among a plurality of the component based on the number of available supplies and the demand data.

9. The inventory management device according to claim 8, wherein the at least one processor obtains the bill of materials at a certain timing and updates the component configuration master.

10. The inventory management device according to claim 8, wherein the behavior history includes viewing behavior or selection behavior, by the user, of the component constituting the object.

11. The inventory management device according to claim 10, wherein the viewing behavior includes a viewing duration and a number of times viewed, and the selection behavior includes a number of times selected.

12. The inventory management device according to claim 8, wherein the behavior history includes a purchase history of the object having a plurality of the component.

13. The inventory management device according to claim 8, wherein the object is a watch, and the component includes a bezel and a band.

* * * * *